United States Patent
Matula et al.

(10) Patent No.: US 10,040,201 B2
(45) Date of Patent: Aug. 7, 2018

(54) SERVICE ROBOT COMMUNICATION SYSTEMS AND SYSTEM SELF-CONFIGURATION

(71) Applicant: Avaya Inc., Santa Clara, CA (US)

(72) Inventors: Valentine C. Matula, Granville, OH (US); George Erhart, Loveland, CO (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/086,506

(22) Filed: Mar. 31, 2016

(65) Prior Publication Data

US 2017/0282374 A1 Oct. 5, 2017

Related U.S. Application Data

(60) Provisional application No. 62/212,409, filed on Aug. 31, 2015.

(51) Int. Cl.
*B25J 11/00* (2006.01)
*B25J 9/16* (2006.01)
*B25J 3/00* (2006.01)

(52) U.S. Cl.
CPC ............... *B25J 11/008* (2013.01); *B25J 3/00* (2013.01); *B25J 9/1689* (2013.01); *G05B 2219/31104* (2013.01); *G05B 2219/31205* (2013.01); *G05B 2219/39117* (2013.01); *G05B 2219/39146* (2013.01); *G05B 2219/40306* (2013.01); *G05B 2219/45084* (2013.01)

(58) Field of Classification Search
CPC .......... B25J 3/00; B25J 11/008; B25J 9/1689; G05B 2219/40306; G05B 2219/31205; G05B 2219/39117; G05B 2219/39146; G05B 2219/45084; G05B 2219/31104; G06F 19/3406; G06F 19/3418; A61B 34/37
See application file for complete search history.

(56) References Cited

U.S. PATENT DOCUMENTS 8,532,820 B1 9/2013 Sampath
8,634,543 B2 1/2014 Flockhart et al.
(Continued)

FOREIGN PATENT DOCUMENTS

WO WO 2010/151038 12/2010

OTHER PUBLICATIONS

U.S. Appl. No. 15/086,303, filed Mar. 31, 2016, Erhart et al.
(Continued)

*Primary Examiner* — Jason Holloway
(74) *Attorney, Agent, or Firm* — Sheridan Ross P.C.

(57) ABSTRACT

A service robot is provided to communicate with other devices of a service location, such as another robot. A first and second robot may be tasked with performing a customer service task requiring a physical interaction. The first robot may determine that the second robot lacks instructions to perform the customer service task. Upon making the determination, the first robot retrieves physical interaction instructions and causes the second robot to load and execute the physical interaction instructions. The second robot is then transformed, by the first robot, into a configured robot able to perform the customer service task.

20 Claims, 19 Drawing Sheets

(56) References Cited

U.S. PATENT DOCUMENTS

| | | | |
|---|---|---|---|
| 8,639,644 B1 * | 1/2014 | Hickman | G06N 3/008 700/245 |
| 8,818,554 B2 | 8/2014 | Lee et al. | |
| 8,892,446 B2 | 11/2014 | Cheyer et al. | |
| 8,924,462 B2 | 12/2014 | Kim et al. | |
| 8,996,429 B1 | 3/2015 | Francis, Jr. et al. | |
| 9,026,248 B1 * | 5/2015 | Hickman | B25J 3/00 700/246 |
| 9,522,471 B2 | 12/2016 | Kuffner, Jr. et al. | |
| 2001/0021909 A1 | 9/2001 | Shimomura et al. | |
| 2002/0165790 A1 * | 11/2002 | Bancroft | G06Q 10/063 705/7.29 |
| 2003/0212472 A1 * | 11/2003 | McKee | G05D 1/0274 700/245 |
| 2006/0184279 A1 | 8/2006 | Okamoto et al. | |
| 2006/0195226 A1 | 8/2006 | Matsukawa et al. | |
| 2009/0157224 A1 * | 6/2009 | Blanc | B25J 9/1674 700/250 |
| 2009/0164638 A1 * | 6/2009 | Jang | H04W 72/10 709/226 |
| 2009/0187278 A1 * | 7/2009 | Zhuk | G05D 1/0088 700/246 |
| 2010/0145514 A1 * | 6/2010 | Kim | B25J 9/161 700/248 |
| 2010/0191372 A1 | 7/2010 | Nihei et al. | |
| 2010/0235218 A1 | 9/2010 | Erhart et al. | |
| 2010/0241693 A1 * | 9/2010 | Ando | G06Q 30/06 709/203 |
| 2010/0296417 A1 | 11/2010 | Steiner | |
| 2011/0022229 A1 * | 1/2011 | Jang | B25J 3/04 700/248 |
| 2011/0125793 A1 | 5/2011 | Erhart et al. | |
| 2011/0125826 A1 | 5/2011 | Erhart et al. | |
| 2011/0264266 A1 | 10/2011 | Kock | |
| 2013/0158707 A1 | 6/2013 | Lee et al. | |
| 2013/0166621 A1 * | 6/2013 | Zhu | H04L 67/12 709/201 |
| 2014/0067121 A1 | 3/2014 | Brooks | |
| 2014/0100491 A1 | 4/2014 | Hu et al. | |
| 2014/0163730 A1 | 6/2014 | Mian | |
| 2014/0229004 A1 * | 8/2014 | Dooley | B25J 9/1658 700/248 |
| 2014/0244036 A1 | 8/2014 | Scott et al. | |
| 2016/0023351 A1 * | 1/2016 | Kuffner | B25J 9/0084 700/248 |
| 2016/0255969 A1 | 9/2016 | High et al. | |
| 2016/0263710 A1 | 9/2016 | Yoshida | |
| 2017/0113353 A1 | 4/2017 | Monceaux et al. | |
| 2017/0125008 A1 | 5/2017 | Maisonnier et al. | |

OTHER PUBLICATIONS

U.S. Appl. No. 15/086,335, filed Mar. 31, 2016, Erhart et al.
U.S. Appl. No. 15/086,388, filed Mar. 31, 2016, Erhart et al.
U.S. Appl. No. 15/086,478, filed Mar. 31, 2016, Erhart et al.
U.S. Appl. No. 15/086,493, filed Mar. 31, 2016, Erhart et al.
U.S. Appl. No. 15/086,541, filed Mar. 31, 2016, Skiba et al.

* cited by examiner

SERVICE ROBOT COMMUNICATION SYSTEMS AND SYSTEM SELF-CONFIGURATION

CROSS-REFERENCE TO RELATED APPLICATIONS

The present application claims the benefit of Provisional Patent Application No. 62/212,409, filed on Aug. 31, 2015, and is incorporated herein by reference in its entirety.

FIELD OF THE DISCLOSURE

The disclosure relates generally to command and control of microprocessor-driven mechanical devices.

BACKGROUND

Automation and mechanization of human tasks has lead to many of the advances found in modern life. Devices, such as robots, are available to provide many functions. For example, low-cost, general purpose personal robots are available as toys or tools for hobbyists. High-powered, high-precision industrial robots are available for industrial or commercial applications. Unfortunately, the cost, power, programming, maintenance, calibration, and other requirements make a human the preferred actor for many needs.

SUMMARY

The present disclosure can provide a number of advantages depending on the particular configuration. These and other advantages will be apparent from the disclosure and the embodiments herein.

In one embodiment, a personal robot may be provided to connect to a business at a customer location. The robot may be programmed and/or instructed to do nearly any function in a house or business on behalf of a contact center agent. For example, repairing a household appliance, pickup and delivery, mending socks, medical functions, etc. A contact center may provide the robot with downloadable or pre-loaded code for fine maneuvering.

Security and privacy are areas of concern in contact center and robot interactions with customers. Authentication, blocked functions, third-party oversight, and standards must be considered, such as to promote trust and overcome resistance to adoption. Documented and demonstrable security and privacy measures promotes consumer acceptance of higher-level robot functions in their home.

In one embodiment, a robotic solution is provided comprising security, privacy, monitoring, and/or interaction capabilities between contact centers and customers. A robot may comprise components that are owned or controlled by a customer. A particular function may be performed by a robot provided via the contact center, the customer, or a combination thereof. Additionally, a robot may interact with customer-owned components (e.g., power supply, communication interface, input-output device, etc.). Robots may have a variety of information gathering tools that, whether real or perceived, present a risk to the contact center if information obtained is misused or stolen and a risk to the customer for loss of information, loss of privacy, and anguish over the potential for such information to be used to perpetrate a crime or other unwelcome action against the customer. Accordingly, when a contact center deploys a robot or interacts with a customer-owned robot or other equipment, security and authentication are priorities. As an extension of the contact center's capabilities within a customer's home, facets of security and connection beyond the current models must be considered and implemented.

Software Security:

As security is a priority, in one embodiment, a contact center has the ability to deem whether a robot is "clean enough" to be trusted as its agent to enter and operate in a customer's home or business. As such, the contact center can employ the following tasks: a) verify that a trusted anti-virus security software/system is present on the robot and operational; b) load a virus scanning software module as part of its downloadable software package for further verification; and/or c) invoke a trusted "cleaning cycle" of a trusted anti-virus software package or operating system capability.

Movement and Interaction Verification:

To verify identity or human physical capabilities, software could be downloaded to authenticate or provide simple human capability verification. Consider the following embodiments:

1. The contact center may command a local robot to ask a local human to tap its shoulder twice, pat its head once, hold both wrists, etc. as a means to verify the mobility and/or language compression of the human.

2. The contact center may command the robot to request that the human go through a physical password. The physical password may comprise, for example, one or more of vocal utterances, arm or hand movements in free space, and additional movements that may involve the robot. For example, one human's password could consist of saying "One, Blue," then taking two steps towards the robot and touching the left shoulder of the robot with the human's left hand.

3. In addition to movement interaction sequences, the robot may be a local agent to accept and authenticate other forms of voice, visual, and interaction multi-factor authentication. Notifications can be provided by robots, agents, and customers as authentication and testing take place.

4. Various algorithms for the duration of the authentication period can be enforced, including: time-based (e.g., good for one hour, etc.), proximity-based (e.g., human must be in sight at all times without interruption to the robot, must be within a certain distance), biometrics-based (e.g., good only while subject is observed to be living, respiration is below 20 breaths per minute, etc.), continuous vocal/audio interaction-based (e.g., robot hears human's breathing, low volume heartbeat effects, requires human to carry on continuous conversation, etc.), and/or event-based (e.g., good until a given event occurs, good for three attempts, etc.). Multiple techniques may be employed for notifying a human that the validation period is coming to a close or needs to be refreshed, including: audio announcements, visual displays, or specific movements (e.g., look at human, extend arms, open/close palm three times as if to ask for a key, etc.).

Authentication Through 3D Reconstruction:

A robot may have one or more movable "heads" and thus one or more fixed or movable cameras. The robot can capture still or video images in optical and non-optical wavelengths, passive and/or induced magnetic field imaging, and/or sonar or other mechanical wave-based imaging. The robot may determine the precise location of the camera relative to the body of the robot. With this information, a robot can be programmed by the contact center to transmit a stream of data to the contact center and enable the contact center systems to perform scene/environment two-dimensional (2D) and/or three-dimensional (3D) reconstructions. With a receiver in the robot's arm, hand, etc., a service like 3D human imaging (e.g., x-ray, sonogram, computerized tomography, magnetic resonance imaging, etc.) may be provided. Reconstructed 3D environments and/or subjects may be used for 3D identification of humans at the robot location, systems/equipment diagnostics, and as an input to holographic 3D scene recreation for use by contact center agents. Alternatively, processing can be done solely or partially by the robot for individual inputs and optionally with a derived 3D scene description transmitted to the contact center.

O/S Blocking Function for Privacy:

A robot provided, in whole or in part by the user (e.g., customer), or "bring your own robot" (BYOR) may gather a wealth of personal information from data collected or analyzed. Accordingly, the robot may employ a base operating system and/or other applications that specifically limit, for example, a contact center application's ability to gather information to only that which is essential for a 3D reconstruction or other permitted/required task.

A robot's imaging may be varied based on a more precise location. For example, while an image of a human patient for medical purposes may have a high frame rate, pixel resolution, and/or pixels per frame up to and including the maximum imaging capacity of one or more cameras. However, travel through the patient's home may be more limited, such as to minimally satisfy the requirement for autonomous travel within the home and avoid capturing unnecessarily detailed images unrelated to a purpose of the robot.

A robot may be limited by owner-provided software and/or configuration as to where images may be permitted (e.g., only in the laundry room for a washer repair application and not the living room or other rooms of the house). Similarly, other information may be limited by a blocking function, such as quality of audio, where audio may be collected, review of audio, etc., or for location, precision of location information, requiring location information to be relative (e.g., three feet from starting point, then two feet, etc.) but not absolute (e.g., no GPS coordinates), so robot can move around the room safely, but cannot transmit the effective location of the house itself. Another function when feeding video from the robot to the agent can be to mask faces other than the authorized human in the home and/or obscure other identifying items. The system and/or application can, based on user privacy settings, pixilate, fuzz, or otherwise sufficiently obscure the faces of other people, children, displayed images (e.g., artwork, photographs, etc.), diplomas, etc. that might be displayed in a home or business.

Blocked and Limited Functions:

Another area of security concern is abated by the contact center having the ability to provide blocked functions, such as blocked fields in co-browsing. Functions can be totally blocked, blocked based on location, blocked based on client's approval, and time-based functions with expiration. For example, with regard to a washing machine repair, a robot may not be permitted to touch physical objects, other than the floor for support, outside of the laundry room, and only allowed to touch and manipulate the washer for the purpose of performing the repair, which may optionally be time-limited (e.g., sixty minutes, etc).

Third-Party Oversight:

Safety can also be a concern when robots are in a home. Third-party oversight can be provided per customer request or by design given the complexity or potential safety issues for a task. A providing company may use a resource similar to VeriSign for this purpose. Consider, for example, the washing machine repair scenario: a customer might be afraid that a contact center-owned robot may use the screwdriver to attack them. The customer can thus request third-party oversight of robot actions. In another example, a customer may be concerned that a robot may damage walls or other property, become entangled in cords, rugs, etc., or otherwise become a hazard to persons or property due to an operation having an unintended consequence.

Several mechanisms are disclosed with regard to providing third-party oversight:

1. The base operating system of the robot can have certain rules preprogrammed into a continuous monitoring oversight function.

2. The local human/owner can acquire third-party oversight software to perform the blocking control function.

3. A contact center/repair company can submit software to a testing institute (e.g., Underwriters Laboratory) for "safety certification."

4. To limit liability, a contact center/repair company can require that either the first or second disclosed mechanism is present on the machine in addition to certifications it may perform on its own software as a "safe harbor" requirement.

5. Institute and advertise a policy requiring third-party oversight when a situation involves a robot's handling of sharp objects, hazardous chemicals, high-value objects, or other high-risk objects.

6. A second trusted robot may be deployed in the home or business for observing the actions of the first robot, whether it is contact center- or customer-owned. "Observing" here can be visual monitoring, monitoring of first robot fundamentals (e.g., speed of movement of an arm, proximity to local humans—keep a safe distance, etc.). Additionally, keep alive/verified sanity interactions between a watchdog master robot and a working robot (owned by a customer or contact center) can be employed. Finally, a trusted robot can be deployed to "protect" the local humans from attack, thrown objects, excessive noise, etc.

Examples of a Dispatched Agent Robot:

1. A home robot, which may comprise third-party software, is dispatched on a mission and leaves premises (e.g., to go grocery shopping, conduct pharmacy pickup, attend community meeting for remote participation, vote, etc.).

2. A robot comprises a control mechanism for spending currency on behalf of owner (e.g., remote validation, voice verification, pre-authorized spending limit, etc.).

3. Standard interface for police identification compliance, such as for identification of a robot and/or robot owner to police in response to the robot performing an illegal action, such as a trespass, traffic infraction, or other criminal or civil violation. Standard interface for government/police-to-robot interaction (e.g., order the robot to abort its mission and leave the area due to a fire or other hazard, etc.). Standard language capability for authority control (e.g., voice language, signal-encoded laser with VeriSign certificate authority and remote command capability).

4. Return-home functionally for a robot in the field experiencing operational issues, failing a self-check, or other out-of-specification condition. The return-home functionality may be implemented, in whole or in part, by third-party software.

In one embodiment, and by way of general introduction, robotic service agents are provided with security and control aspects similar to those provided to human service agents (e.g., repair personnel, home healthcare workers, cleaners, etc.). For example, human service agents may be restricted, either formally or by expectations, to conform to certain physical constraints of the service area, such as a home. In particular, a human service agent on-site at a service area for the purpose of repairing a refrigerator may be allowed free access to the kitchen area with the refrigerator and points between the refrigerator and the entry to the service area, but cause concern if they enter a bedroom.

In order for robotic service agents to be more readily accepted, security concerns, whether real or perceived, need to be addressed. In part, robotic service agents may need to be confined to a "need to know" mode of operation and not access locations or information that is not required to perform a task for which the robotic service agent is being utilized. Use of robotic service agents may instill security concerns similar to those of human service agents (e.g., theft, accessing unjustified areas of the service area, gathering information without a bona fide reason, harm to persons or property, etc.). Additionally, robotic service agents are computers which comprise input components (e.g., microphones, cameras, radar, etc.) and communication components (e.g., WiFi, cellular, Ethernet, Bluetooth, infrared, etc.). A user or customer of a robotic service agent may be concerned that the robotic service agent is a "Trojan horse" utilized for communicating gathered information to parties unknown, or known but potentially nefarious. Robotic service agents have one or more physical capabilities, which may be another source of concern. For example, programming or instruction failure or error, mechanical failure, communication failure, action of a bad-actor in communication with the robotic service agent, or other condition may be perceived as a physical risk to persons, property, or data. For example, a robotic service agent may knock over a lamp, steal a wallet, attack a human with a screwdriver, or cause a storage device full of family pictures to be purged. Even if a particular robotic service agent is not capable of perform such unwanted acts, the perceived risks may still require management and mitigation in order for robotic service agents to gain broader acceptance.

Robotic service agents may be embodied as end-user (e.g., customer) owned and operated, contact center-owned and/or operated device, third-party-owned and operated, or various portions and combinations thereof. In one embodiment, the customer may own a portion of the robot but a particular task requires a specialized tool. The contact center or third-party may provide the tool, which may be kept by the customer or returned upon completion of the task. In another embodiment, the customer may own computational and/or communication portion and access software from the contact center or third-party, to allow specialized functionality of the robotic service agent.

Sourcing a robotic service agent's components, in order to configure the robotic service agent to be able to perform a particular task, may come from a variety of sources and, as a result, the associated security vulnerabilities may also come from a variety of sources. Errant or malicious software (e.g., viruses, malware, bugs, etc.) may be found in legitimate software of the customer, contact center, third-party, and/or other software provider. Additionally, imposter software; data interception; loss of communication and/or control; incompatibility with logical and/or physically attached components; flawed hardware, and/or other component may allow the robotic service agent to operate in a manner outside of its intended service purpose.

In one embodiment, systems and methods are provided to dispatch a service robot and configure the service robot via downloadable software enabling the robot to perform a contact center service task. A customer service software application for robots is disclosed, which may comprise programmable customer service applications. Systems and methods are also provided for enabling downloadable or pre-loaded software code to execute on a robot to establish a coordinated connection and monitoring of contact center and/or customer-owned robots for service tasks. For example, when a robot arrives at a customer's home, the robot can communicate with other robots and/or agents in the house and back at a contact center.

In one embodiment, an autonomous application is loaded and executed to cause the robot to perform a customer service task without agent interaction. Optionally, a contact center may monitor, record, report, or otherwise utilize data collected from the robot executing the autonomous application. If a customer asks for assistance (supervision), an agent is then brought into the robot-customer and/or robot-service location interaction.

In another embodiment, a connection application is provided to enable an agent, located off site, to assist in the performance of a customer service task.

In another embodiment, an occupant-robot shared application is provided. For example, a robot is provided to a home with automated components (e.g., smart lights, smart security system, cameras, wired doors, smart appliances, programmable/automated cupboard hinges, etc.). The robot could be deployed or owned by a user and possess the physical capabilities to cook a meal. However, programming a robot to cook a particular meal could be difficult or even impossible for a particular customer. Instead, the customer can contact a meal cooking service, which can then take control of the robot's physical capabilities for a certain amount of time or upon the completion of the task. The robot and the other automated components (e.g., smart storage systems, ovens, food processors, etc.) of the home may then be leveraged by the call center agent to equip the robot to cook the desired meal. Once done, the control of the robot and the automated components of the home may be released back to the control of the customer.

In another embodiment, robot-observed activity may be mapped into potential sales or advertisements. The robot can observe activities in the home or listen to conversations in a manner similar to web sites observing internet interactions (e.g., web chat, emails). From observing human activity or interactions, the robot may locally analyze the information or relate the information back to the contact center for analysis. As a result, potential "suggestions" may be determined for solutions to home problems; such suggestions may comprise advertisements. The robot may present the suggestions on a display visible to the occupants, weave suggestions into conversations, and/or provide demonstrations of such potential services, which may be driven by an application.

In one example, an occupant of a home with a robot is heard to say, "I have a headache." The robot may then reply with, "Would you like some Brand-X aspirin, it's known to cure headaches." Such an example may drive an off-site sale (e.g., the occupant goes to the store and makes a purchase), an on-site sell (e.g., the robot or other device is utilized to place an order), sell the use of a service (e.g., an on-demand movie to cure boredom), or prompt the user to utilize a product already in the home, such as the aspirin currently in the cupboard, with the idea that consumption will then drive restocking purchases.

In another example, a robot observes an occupant having difficulty climbing stairs. In response, the robot may respond with, "If I load the HOMECARE™ Mobility App for $249.99/mo, I would be programmed to autonomously assist in helping you up the stairs and bathing you. For $349 a month, a live agent would be connected continuously during bath time to oversee my operation."

In another example, a robot observes an occupant having difficulty climbing stairs. The robot provides a video clip and/or an analysis related to the observed behavior to an agent of the contact center selected based upon the observation and/or analysis (e.g., an agent skilled in geriatric, mobility, or similar issues). Contact center software selects the agent to interact with the robot, where the agent directs the robot to offer the service, or sends an email, message, or video, or other communication to the occupant offering the service.

In another embodiment, a basic service may be offered to the occupant in return for accepting additional sharing of information. This additional information may provide more advertisement opportunities or reveal that the occupant is eligible for additional government-paid services, which may then be communicated to the occupant and/or facilitated by the contact center. In another embodiment, information about occupant capabilities observed may be sold to companies for the purpose of advertisement placement similar to sharing mailing lists. Advertisements placed via the robot may be charged back to different companies. Different levels of charging could be associated with different methods of advertising (e.g., woven into a conversation versus displayed on an integrated chest display, etc.).

Time-based or temporary duration applications are also provided by certain embodiments herein. An agent and/or robot may install an application to perform one or more service tasks at a particular time or during a specific period of time (e.g., fix your dishwasher program) and uninstall the software once the service task is complete (e.g., dishwasher repaired). The contact center may provide robots that have preloaded or downloadable distributed services comprising varying options based on available bandwidth, recording ability, and/or delivery capabilities.

In another embodiment, bandwidth considerations are provided to address the gamut of bandwidth issues and enable the best robot experience in light of variations in bandwidth, in particular, intermittent, temporary, or long-term degradations. In a further embodiment, a task to be performed by a robot has a known bandwidth requirement. Accordingly, a contact center bandwidth admission control may be provided to control how many robots communicate with the contact center, agent, and/or agent pool in light of the available bandwidth.

In another embodiment, home bandwidth control is provided. An estimated total bandwidth load of a home network may be determined and, if insufficient to accommodate all needs, the contact center may postpone other devices (e.g., other robots) communicating, or throttling the communications utilized by other devices, in the home via a coordinated communication until the bandwidth limitations are removed and/or the robot has completed a bandwidth-sensitive task.

In another embodiment, task bandwidth control provides bandwidth prioritization. The control may include fine-grained control based on parallel functions executed in a single or coordinated process, including allocating bandwidth for robot function. The robot may then be enabled to prioritize different traffic types based on functions (e.g., first priority—audio, second priority—video, remote motor control—second priority with video reprioritized to a third priority, etc.).

In another embodiment, a multi-robot bandwidth coordination and control signal is provided by a robot. The signal may be broadcast to other devices (e.g., other robots) in the house, such as to inform the other devices that the broadcasting robot is about to initiate a dangerous operation that requires a substantial portion of the available bandwidth for a period of time (e.g., 1 Mbits/s for ten minutes). The other devices may then defer bandwidth utilization or another component (e.g., router) may receive the signal and reserve the bandwidth for the robot, and/or communications to/from the robot may be prioritized above other traffic. Additionally, the alternative communication paths may be provided, such as due to an emergency. For example, a robot may normally utilize a Wi-Fi connection. However, if the Wi-Fi signal degrades during a critical procedure, the robot may then fall back to another communication channel (e.g., 4G/LTE data tethering).

The term "robot," as used herein, refers to a robotic service agent comprising a microprocessor, physical capability in communication with the microprocessor, and a communication interface.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

Figure 1:
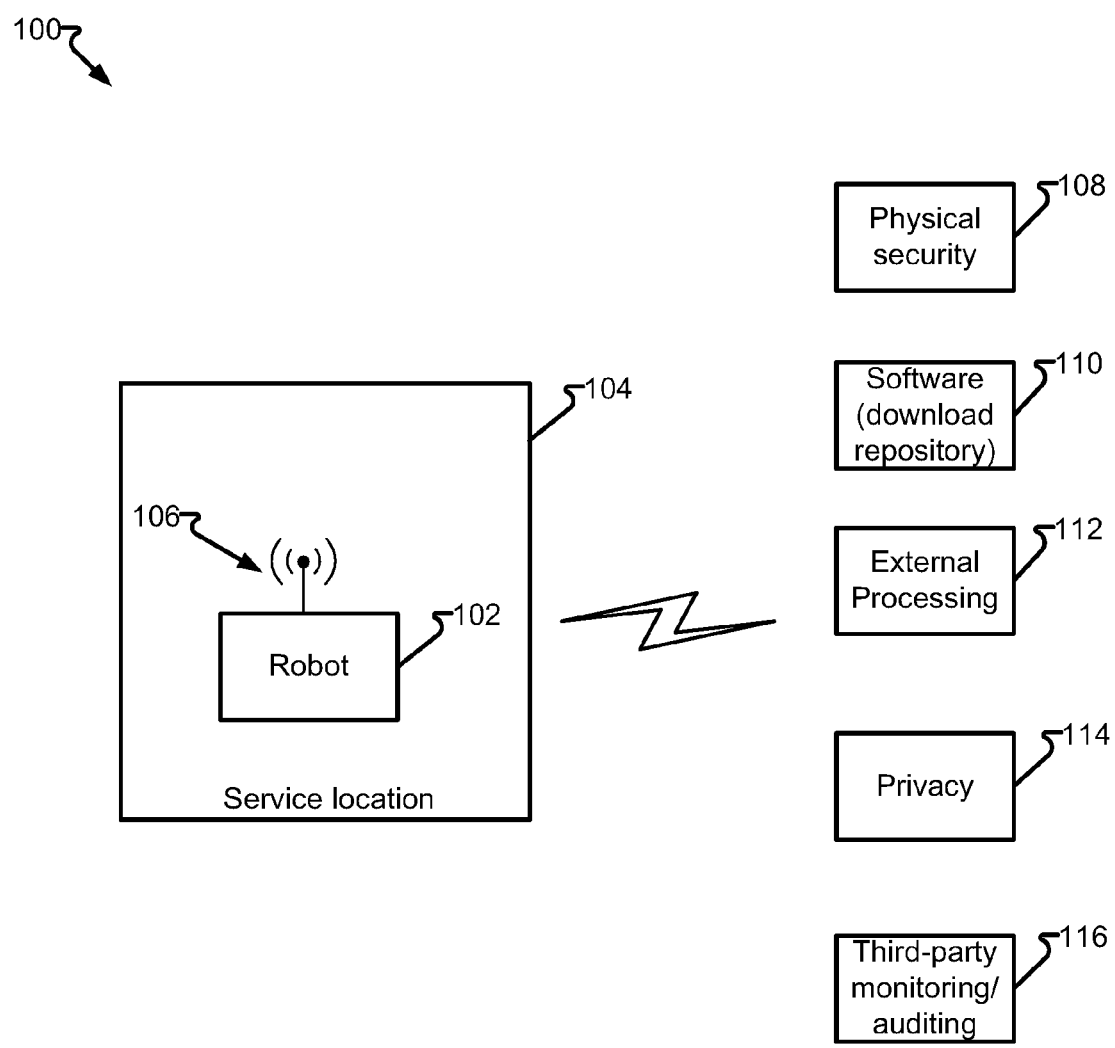
FIG. 1 depicts a first system in accordance with embodiments of the present disclosure.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

In one embodiment, a first robot is disclosed, comprising: a processor; an interface connecting an input/output device to the processor; the processor: receives a request, via the interface, to perform a customer service task at a service location, the customer service task comprising a physical interaction by a second robot at a service location; determines the second robot is in an unconfigured state, comprising a set of instructions absent a physical interaction instruction required to enable the second robot to perform the physical interaction; and upon determining the second robot is in the unconfigured state, causes the second robot to be transformed into a configured state, comprising providing the physical interaction instructions to the second robot.

In another embodiment, a method is disclosed, comprising: receiving at a first robot comprising a processor, a request via an interface between the processor and an input/output device, the request further comprising a request for performance of a customer service task at a service location, and the customer service task further comprising a physical interaction by a second robot at the service location; determining, by the processor, the second robot is in an unconfigured state, the unconfigured state comprising a set of instructions absent a physical interaction instruction required to enable the second robot to perform the physical interaction; and upon determining the second robot is in the unconfigured state, causing, by the processor, the second robot to be transformed into a configured state, comprising providing the physical interaction instructions to the second robot.

In another embodiment, a system is disclosed, comprising: means to receive at a first robot comprising a processor, a request via an interface between the processor and an input/output device, the request further comprising a request for performance of a customer service task at a service location, and the customer service task further comprising a physical interaction by a second robot at the service location; means to determine, by the processor, the second robot is in an unconfigured state, the unconfigured state comprising a set of instructions absent a physical interaction instruction required to enable the second robot to perform the physical interaction; and upon determining the second robot is in the unconfigured state, means to cause, by the processor the second robot to be transformed into a configured state, comprising providing the physical interaction instructions to the second robot.

FIG. 1 depicts a system in accordance with embodiments of the present disclosure. In one embodiment, robot 102 is provided to service location 104 to perform a task. The task may comprise one or more physical aspects or activities within service location 104. Service location 104 may be any customer-controlled location, including, but not limited to, interior and/or exterior portions of a home, retail, commercial, municipal, or industrial facility. Robot 102 may be entirely or partially owned by the customer. It should be noted that owned includes, but is not limited to, having legal title, possession, authority over, management over, stewardship of, rented, leased, borrowed, or other control associated with legal possession and authority to act as an owner, less any rights contractually surrendered. In another embodiment, robot 102 is entirely owned by a contact center, or other entity.

In another embodiment, a portion of robot 102 is owned by a customer and another portion is owned by the contact center. The portion of robot 102 owned by the contact center may be hardware and/or software. For example, a customer may wish to deploy robot 102 to perform a specialized task, such as to repair a washing machine. Robot 102 may require specialized tools to perform such a task. Accordingly, the customer may contact the contact center or other entity and schedule delivery of a component to coordinate with robot 102 and provide the tools necessary to complete the task. In another embodiment, robot 102 may not have instructions to perform a task. The customer may download or otherwise acquire instructions to enable robot 102 to perform the desired task. In yet another embodiment, software instructions may be provided as embedded software with an attachment. To continue the prior example, robot 102 is fitted with a specialized tool required to repair a washing machine. The specialized tool, which may be a "dumb" tool (e.g., wrench, lift, pulley, etc.) and not require any computational ability for itself to operate, but may contain a media comprising instructions that, once in communication with robot 102, enables robot 102 to perform a task. The specialized tool may also be a "smart" tool (e.g., robotic arm, etc.) having a microprocessor and its own instructions and optionally a media having instructions for robot 102 to perform the task or a portion thereof. For example, a specialized tool may perform an operation, such as applying a force to a shaft held by a bearing and robot 102 may be configured by the instructions to examine images of the bearing captured by a camera and, based thereon, determine if the bearing has failed.

Robot 102 may be entirely autonomous, autonomous once positioned in a predetermined location or proximate to the object of a task, or a drone or proxy for an operator, such as a supervisor robot or agent of a contact center remotely controlling robot 102 in whole or in part. Control may alternate from robot 102 to a networked supervisor, human or robotic, based upon progression of the task, specific waypoints in a task, or due to component or linkage failures. In one embodiment, a human remotely operating robot 102 may suffer a loss of communication and robot 102 may proceed autonomously to ensure the task progresses or is placed in a safe state. For example, an agent of a contact center may be remotely operating robot 102 and attempting to light a pilot light of a gas water heater when communication between the contact center and agent are lost. Robot 102 may be configured to then discontinue attempting to light the pilot light, turn off the gas supply, and wait for communications to be restored.

In another embodiment, robot 102 may interact with one or more human and/or automated resources. For example, robot 102 may utilize an on-board speaker or display to communicate with a human, such as to request assistance in locating the object of the task. In another embodiment, robot 102 may communicate with an off-site resource (human and/or automated) to access data, instructions, etc. or to provide data, which may include, but is not limited to, images, videos, sound, and/or other data (e.g., serial numbers, settings, display values, etc.).

Security for robot 102 and the actions performed by robot 102 may be a particularly sensitive issue for consumer acceptance, such as the owner, occupant, controller, etc. of service location 104, which may comprise personal or other sensitive information and objects and persons. Robot 102 may comprise, in part, a computer with communication ability and be subject to viruses or other malware. Accordingly, robot 102 may be provided with anti-virus software, which may be verified and provide assurance that robot 102 operates without influence from unauthorized parties. While certain on-board security measures may be implemented (as discussed more completely with respect to FIG. 2), external monitoring, command, and/or control resources may be provided to robot 102 directly, such as via a direct signal received by, sent from, antenna 106 (e.g., WiFi, cellular, Bluetooth, GPS, etc.). Antenna 106 may be configured to operate using other electromagnetic signals (e.g., infrared, radar, etc.) and/or mechanical signals (e.g., sound, feelers, etc.).

Robot 102 may communicate before, during, and/or after entering service location 104 with one or more monitoring services, such as physical security 108. Physical security 108 may monitor a number of inputs, for example, to determine that robot 102 is at the correct service location 104, is not removed from service location 104 (e.g., stolen), opened by an unauthorized party, subject to stresses outside of predetermined limits (e.g., being hit, falling down stairs, colliding with an object, etc.). In another embodiment, physical security 108 may define operations to avoid damaging or accessing (actual or perceived) unauthorized data (e.g., electronic "eavesdropping," audio/visual eavesdropping, room layouts, images or identification of items/persons unrelated to the task, etc.). Physical security 108 may then monitor the position of robot 102, data that is, has been, or could be gathered and apply means to terminate such a security breach (e.g., temporarily disable the microphone), dispose of inappropriate or unrelated data (e.g., discarding room maps or images), and/or require permission to perform an action from remote and/or on-site resources (e.g., "Mr. Smith, may I have access to your electrical service panel?").

We now consider example scenarios and the embodiments disclosed therein. In a first scenario, a customer encounters a middle-of-the-night chirping of a smoke detector with a failing battery. The customer is unable or unwilling to climb a ladder to replace the battery themselves or have another person do the task. Accordingly, the customer opens a service request with a contact center to have a new batter replaced by robot 102.

In a first sub-scenario, the customer owns robot 102, which is configured to perform the entirely of the task. Robot 102 is provided with a replacement battery, or configured to access a replacement battery, and performs the replacement. In a second sub-scenario, the customer owns robot 102, which comprises hardware to perform the task, but lacks sufficient instructions to perform the task. The customer accesses a set of instruction software 110, such as via a web interface to an application store, acquires the store for provisioning robot 102 which is then deployed to replace the battery. Alternatively, robot 102 may utilize in whole or in part, external processing agent 112 to perform real-time or near real-time data processing. For example, robot 102 may acquire an image of the smoke detector and utilize external processing agent 112 to provide an update to the procedure based upon identification of the particular make and model of the smoke detector (e.g., the particular model requires a modification to the instructions in order to access the battery compartment, etc.). In a third sub-scenario, the customer owns robot 102 which lacks the physical capacity to perform the task. The customer arranges for associated hardware, which may then be physically or logically attached to robot 102 to perform the task. For example, robot 102 may lack the ability to access the smoke detector. An accessory may be provisioned that either flies, climbs walls, has extension legs, or has other means of accessing the ceiling and the smoke detector to perform the task or enable robot 102 to perform the task.

In a fourth sub-scenario, the customer does not own robot 102 or is otherwise unable to provide any hardware to assist robot 102 in performing the task. Accordingly, the customer may acquire robot 102 for the purpose of performing the task.

The forgoing scenario, and related sub-scenarios, illustrates certain basic operations and components utilized in performing a task. Additional components and instructions utilized to perform a task, as well as to help ensure success, protect persons, property, and data, and promote customer acceptance, may be provided. Robot 102 may image the room or other area to identify the location of the smoke detector. In the process, robot 102 may acquire images of people, including children, the layout of the home, location of objects of value, pictures, etc. as well as acquire certain information related to communications (e.g., wireless router name and password, network attached devices, etc.). Privacy monitoring 114 may provide instructions to robot 102 (e.g., delete certain information, downgrade the image quality showing certain elements, turn off microphones, purge all acquired data after thirty minutes, etc.). Additionally, third-party monitoring/auditing 116 may be provided to ensure compliance via certification services or other verification. It should be appreciated that physical security 108, privacy 114, and/or third-party monitoring/auditing 116 may be provided, at least in part, on-board robot 102 and/or a component associated with service location 104 (e.g., networked device with monitoring software, etc.).

Robot 102, particularly when located within service location 104, may be subject to monitoring by a number of human and/or automated agents. In one embodiment, robot 102 is within service location 104 and communicates with other agents, such as by sending and receiving signals utilizing antenna 106. Communication components are discussed in greater detail with respect to FIG. 2. Robot 102 may then operate within service area 104 to perform a task. The presence of the entities and their status, such as whether or not a particular entity is actively monitoring robot 102, may be reported, such as via message, website, etc. to inform authorized persons of interest that robot 102 is operating as intended.

In one embodiment, robot 102 communicates with physical security agent 108. Physical security agent 108 may ensure robot 102 is within the expected location for robot 102 (e.g., geo-fencing). Additionally, physical security agent 108 may receive security state indicia indicating that robot 102 has encountered a security threat such as by an accelerometer within robot 102 reporting a signal indicating robot 102 has fallen down a stair or been struck. Other security state indicia may indicate an attempt by an authorized party to access an internal component, remove a component, disable or hinder operation, or other hazard which robot 102 may encounter.

In yet another embodiment, physical security agent 108 may include environmental risks to robot 102 such as power spike, temperature, pressure, hazardous chemical, debris, particulate matter, or other unacceptable operating parameter. Physical security agent 108 may signal robot 102 and/or on-site personnel to remove robot 102 from its present location.

Physical security agent 108 may be an automated supervisor agent that monitors signals and if a security risk is detected, initiate a response. If it appears robot 102 is leaving service location 104, but such a departure is not expected or authorized, a party may be attempting to steal robot 102. Accordingly, physical security agent 108 may signal robot 102 to respond, such as by playing a recorded or live audio message (e.g., "Please return me to the service area," "Help! I'm being stolen," etc.), which may be interactive via a microphone and/or camera ("Mr. Customer, why are you moving the robot outside?"). Physical security agent 108 may then authorize the removal if appropriate (e.g., "I am placing the robot outside to be picked up. I no longer need its services").

Physical security agent 108 may take other actions such as notification of law enforcement, recording images, audio, GPS, and/or other data which may be used by law enforcement to locate robot 102 and parties attempting to steal robot 102. Robot may have a siren, loudspeaker, strobe or other attention-getting signals which may be activated upon a response by physical security agent 108. When physical security agent 108 detects deliberate or suspected deliberate misuse or abuse of robot 102, physical security agent 108 may present the abusing party, via robot 102 and/or other communications channel (e.g., call, text, etc.), with a warning to discontinue such actions, indicate a penalty (e.g., loss of privileges, fee, etc.), or other action designed to mitigate harm inflicted on robot 102 and/or the financial loss to the owner of robot 102.

In another embodiment, physical security agent 108 may monitor robot 102, and inputs received from components of robot 102, to protect persons, property, and data. For example, before performing a high-risk operation (e.g., lighting a gas pilot light, touching an object known to have a high risk of shattering, etc.) physical security agent 108 may require, directly or via robot 102, that all human personnel are at a safe distance before the task is allowed to be performed. In yet another embodiment, physical security 108 may halt the actions of robot 102 and optionally take over inputs (e.g., manipulate a camera, apply a force with an arm, etc.) and, once physical security agent 108 is satisfied, signal robot 102 to proceed with its actions. In still another embodiment, physical security agent 108 may observe an event (e.g., child or pet approaching the robot or other violation of a safety or security protocol) and signal robot 102 to halt operations or perform a safe shut-down (e.g., place itself and other objects under control of robot 102 into a safe condition).

In another embodiment, software agent 110 provides access to one or more downloadable software applications, patches, libraries, etc., to be maintained by a media of robot 102 for future execution. Software agent 110 may receive a request for a service and identify a particular software application or respond to a request for a particular software application. Software agent 110 may access the software application from a repository and may further require an account, payment, authorization, or other permission from personnel associated with service location 104, an agent associated with robot 102, an agent associated with the particular software application, government regulatory agency, and/or other permission-determining entity with the decision-making authority for at least one of robot 102 and service location 104.

In another embodiment, external processing agent 112 provides live executable software to robot 102. Robot 102, even when configured to perform a task, may lack data or data processing required to perform at least a portion of the task. Accordingly, robot 102 may communicate with external processing agent 112 to gain additional data accessing and/or data processing resources. For example, robot 102 may be tasks to repair a washing machine. Due to a parts shortage, the manufacturer installed a motor different from the motor provided in the documentation, which robot 102 may currently have accessed. Robot 102, or other agent in communication with robot 102, may identify the discrepancy. However, robot 102 may not have access to the correct information regarding the actual motor. Accordingly, robot 102 may access external processing agent 112 to access motor documentation, which may comprise instructions for robot 102 to perform a service (e.g., location of mounting bolts, disconnection procedures for wires, etc.). In another example, robot 102 may be performing a task in service location 104 which requires external knowledge (e.g., external temperature, barometric pressure, etc.), such as to calibrate an environmentally-sensitive machine. Robot 102 may access external processing agent 112, causing external processing agent 112 to locate and provide the requested information.

In another embodiment, external processing agent 112 provides at least a portion of executable instructions. For example, with respect to at least one function of robot 102, robot 102 is a "dumb terminal" having processor-executable instructions provided by external processing agent 112 without storing or attempting to store a complete, or substantially complete, set of the instructions in a media of robot 102. In yet another embodiment, external processing agent 112 provides command and control signals to and/or from robot 102. The signals may configure robot 102, operate robot 102 or a portion of robot 102, utilize an input/output device of robot 102, and/or other remote operation directed by external processing agent 112.

In another embodiment, privacy agent 114 may monitor robot 102, and components thereof, to ensure compliance with a privacy policy. In one embodiment, privacy agent 114 detects and reports compliance, or lack of compliance, with a privacy policy. In another embodiment, privacy agent 114 enforces the privacy policy. For example, a robot 102 may be moving throughout service location 104 to access the location for a task. Persons, photographs, and other images may be encountered. Accordingly, privacy agent 114 may cause the camera(s) of robot 102 to degrade (e.g., lower resolution, fewer frames, altered contrast or other image setting, introduced noise, redaction, etc.) until such time as the cameras are required to perform the task. Information gathered, but not needed after the task has been complete, may be monitored by privacy agent 114 and optionally, purged upon privacy agent 114 signaling robot 102.

In another embodiment, third-party monitoring agent 116 monitors and/or audits robot 102. Third-party monitoring agent 116 may receive signals from robot 102 and/or any other agents (e.g., agents 108, 110, 112, 114), human-submitted observations, other automated systems (e.g., robot delivery/servicing, financial, credit reporting, etc.) to determine if robot 102 is operating within a previously determined protocol. Third-party monitoring agent 116 may determine if a violation of protocol has occurred and signal personnel associated with at least one of service location 104, robot 102, and/or other human or automated agent that such a violation has occurred. In another embodiment, third-party monitoring agent 116 may cause, directly or via other agent (e.g., agents 108, 110, 112, 114), and/or personnel to perform corrective action to cause robot 102 to return to operating within the previously determined protocol.

Third-party monitoring agent 116 may access, physically and/or logically, robot 102 before, during, and/or after the performance of a task at service location 104. Should a problem be encountered (e.g., a virus, out-of-protocol programming, etc.) third-party monitoring agent 116 may signal appropriate systems and/or personnel to remedy the issue. For example, a protocol may be established that causes robot 102 to purge all location mapping and images associated with service location 102 upon leaving service location 102. Should third-party monitoring agent 116 perform an audit or otherwise determine that such information was not purged, personnel and/or systems may be signaled that robot 102 has operated outside of the protocol. Accordingly, a malicious or errant program that caused any data to be erroneously retained may be addressed and, if successful, third-party monitoring agent 116 may indicate that robot 102 has returned to operating within the protocol. Additionally, how such errant instructions came to exist in robot 102 may be analyzed to prevent further violations or identify the potential actions of bad actors.

In one embodiment, each of agents 108, 110, 112, 114, and 116 are located externally to robot 102. In another embodiment, at least one of agents 108, 110, 112, 114, and 116 is located internally or co-located with robot 102, entirely or in part. For example, physical security agent 108 may comprise an on-board theft or abuse detection and response component to respond promptly but may be directed by or communicate with an external portion of physical security agent 108, such as a human or automated agent in a contact center which may take, or override, a self-defense, self-preservation, alarm, location, evidence gathering, or other loss prevention action.

Figure 2:
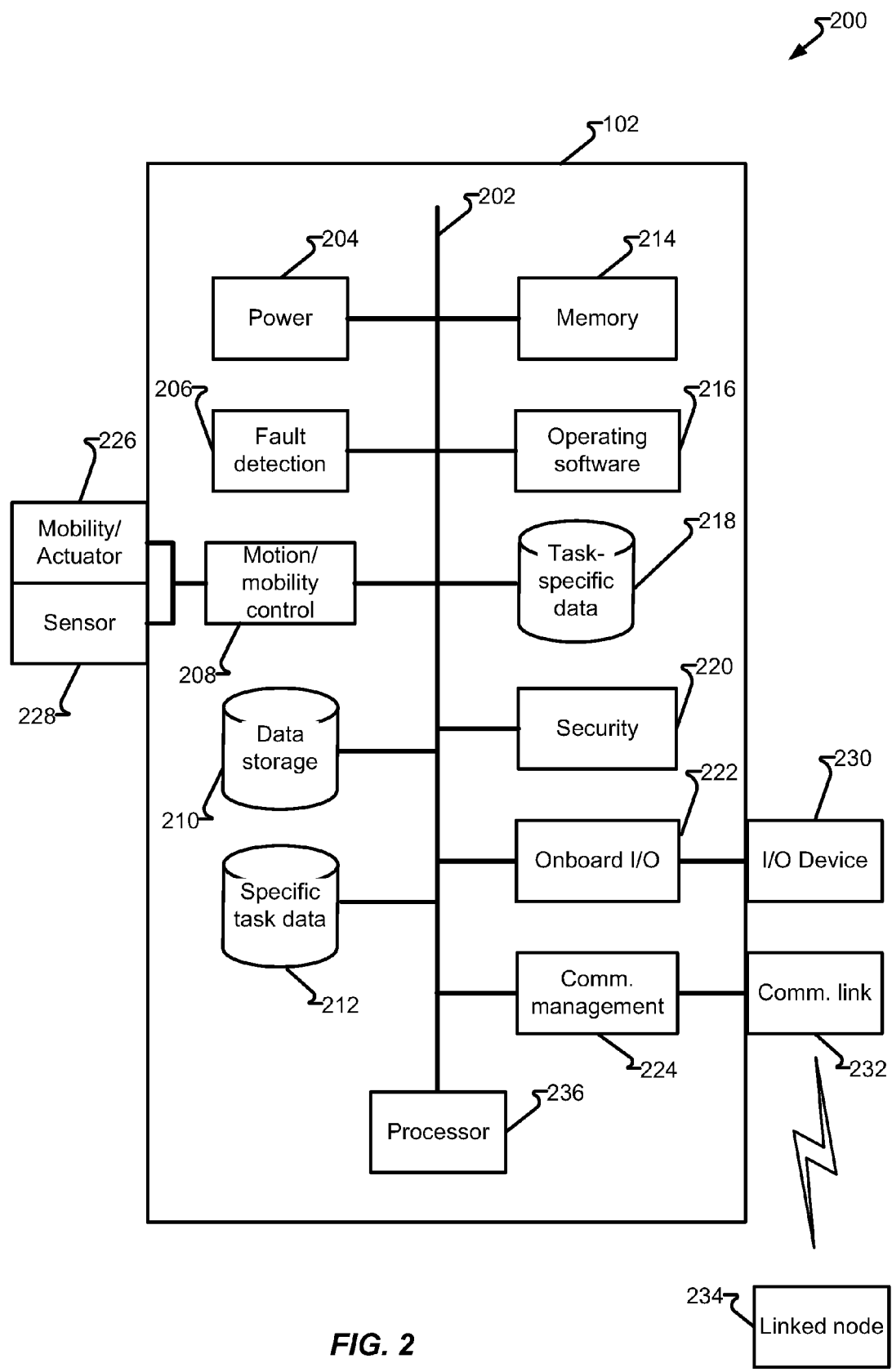
FIG. 2 depicts an architecture in accordance with embodiments of the present disclosure.

FIG. 2 depicts architecture 200 in accordance with embodiments of the present disclosure. It should be appreciated that robot 102 generally, and when configured to perform a specific task, may comprise more, fewer, different, and/or differently arranged components from those illustrated without departing from the scope of the disclosure provided. Robot 102 comprises a number of internal physical and logical components that may be utilized for performing tasks and other operations of robot 102. Robot 102 may interact with the outside world physically by utilization of one or more of mobility/actuator 226, sensor 228, I/O device 230, and communications (or "comm") link 232.

Robot 102 comprises at least one: the physical capability. In one embodiment, the physical capability is provided by an I/O device 230 as embodied by an output device, which may include, but is not limited to, visual display, speaker, vibrator, indicator, electro-mechanical output, actuator, emitter, etc.

Sensor 228 and/or mobility/actuator 226 may enable robot 102 with physical movements and optionally measure attributes associated with the physical movements. For example, mobility/actuator 226 may be a rotational motor of an arm attached to, or controlled by, robot 102. Sensor 228 may be an encoder monitoring the position of the arm to ensure precision of the rotation of the arm. Sensor 228 may be or utilize other components of robot 102. For example, mobility/actuator 226 may be a rotational motor turning a screw. Sensor 228 may be embodied as a camera (e.g., one of I/O devices 230) and terminate the rotational motion when the camera detects the screw is properly positioned or, if removing the screw, no longer present. Sensor 228 may be embodied as a microphone (e.g., one of I/O devices 230) and detect the sound of the screw falling into a collection pan. Sensor 228 may be a torque-measuring component and determine the screw has been sufficiently tightened or, if the torque abruptly falls, the screw head may have been stripped or sheared off. Upon successfully, or unsuccessfully, completing the task, mobility/actuator 226 may discontinue rotating the screw.

Mobility/actuator 226 may comprise, but not be limited to, an electro-mechanical output to provide robot 102 with locomotion, positioning, orientation, etc. for itself and/or an attachment or associated component. Mobility/actuator 226 may provide an electro-mechanical output to provide robot 102 with a means of applying a force (e.g., push, pull, bend, shear, twist, rotate, etc.), directly or via an attachment or associated component, to another object.

In another embodiment, the physical capability as provided by I/O device 230 embodied as an input device may include, but is not limited to, a sensor, which may be the same as sensor 228 monitoring an associated mobility/actuator 226 or a different I/O device 230 may be configured to provide robot 102 with inputs regarding external factors including, but not limited to, force, temperature, pressure, chemical, electromagnetic, particle, acoustic/mechanical wave, position, location, orientation, acceleration, etc.

Robot 102 may communicate with other electronic devices via communications link 232. Communications link 232 may communicate via radio-frequency (e.g., Bluetooth, WiFi, GPS, cellular, two-way radio, etc.), infrared, or by using other portions of the electromagnetic spectrum. Communications link 232 may comprise a wired communication link including, but not limited to, direct connection to another device proximate to the robot, wired telephone, wired Ethernet, and/or wired port (e.g., USB, HDMI, fiber optic, DVD reader/player, etc.).

Onboard I/O 222 provides input/output translation (e.g., drivers, language translation, etc.) to enable other components of robot 102 to utilize/provide input/output device 230. I/O device 230 may allow for the direct interaction with Robot 102 and comprise one or more of direct input device (e.g., keyboard, mouse, trackpad/trackball, electro-mechanical inputs, dynamically determined function button (soft button), camera, microphone, etc.). I/O device 230 may be embodied as an audio device, such as a microphone and speaker, to receive spoken commands, locate sound-emitting sources, acoustic location (sonar), interact with human or automated personnel using a spoken language, audio signal (e.g., alarms, conformation tones, sirens, etc.). I/O device 230 may be embodied as a camera to receive gesture commands, locate objects, locate position of robot 102, or other visual operation. I/O device 230, when embodied as a camera, may comprise a sensor configured to detect one or more electromagnetic wavelengths, including, but not limited to, visual, infrared, ultraviolet, and x-rays. I/O device 230 may comprise imaging and/or distance measuring components (e.g., Radar, LIDAR, etc.). I/O device 230 may also be embodied as a mechanical wave imager (e.g., sonogram, sonar, seismic, etc.). Additionally, mobility/actuator 226 and sensor 228 may operate as a probe to measure distance or determine position for robot 102 or an associated component. In yet another embodiment, I/O device 230 may comprise an emitter configured to provide heating, cooling, partial or wave radiation, chemicals, etc.

Robot 102 comprises a number of components generally local to robot 102. It should be appreciated that local components are generally internal to robot 102, but local components may be externally located (e.g., plugged-in, attached, etc.) or even networked (e.g., accessed via communication link 232) are also contemplated and are within the scope of the disclosure provided herein. Internal components may be interconnected via bus 202 providing data, signals, and/or other information between components of robot 102. Bus 202 may comprise, but not be limited to, inter/intra chip bus, backplane, jumper, etc.

Robot 102 comprises, in part, a computer. As such, robot 102 comprises power module 204 to provide power to components, such as processor 236 and other components. Power 204 may manage batteries, cause the signaling of a low-power state, monitor and/or manage direct power connections, and/or provide power to other components, such as mobility/actuator 226. Power 204 may respond to queries, such as to determine the estimated power duration available or if a certain amount of power, such as to perform a task, is available. Power 204 may manage power from a variety of sources (e.g., solar panels, plug-in, batteries, mechanical energy stores (e.g., springs), etc.) and provide such power to components needing power.

Fault detection 206 comprises means to detect, and optionally manage, any out of parameter operation of robot 102. In one embodiment, processor 236 commands mobility/actuator 226 to apply a force to an object. Mobility/actuator 226 draws power, via power 204, commensurate with the desired force. However, the actually force measured by sensor 228 may be outside of an expected for the force. Fault detection 206 may determine that a fault exists and apply an adjustment (e.g., increase the amount of power requested to apply the desired force) or indicate a fault, known or unknown, which may lead to robot 102 discontinuing a task, seeking assistance from a human or automated agent, or other action associated with a particular fault.

Motion/mobility control 208 comprises drivers and/or other components utilized in translating a requested action into a resulting action. Motion/mobility control 208 may comprise device-specific drivers, for example, mobility/actuator 226 may be a robotic arm having a first set of functionalities. Upgrading the robotic arm may introduce new or different functionalities and, accordingly, motion/mobility control 208 is modified accordingly. In one embodiment, legacy support is provided so that processor 236 issuing a command to the arm (e.g., "retract") performs the same action on the upgraded arm. Additional, different, or fewer commands/features may also be provided by a particular mobility/actuator 226 and/or sensor 228, and accommodated by, motion/mobility control 208.

Data storage 210 and/or memory 214 comprises a medium enabling data to be stored and accessed by robot 102. Data storage 210 and memory 214 may be integrated or distinct and comprise magnetic, optical, electrical, and/or other data storage media.

In one embodiment, robot 102 may require task-specific instructions and/or data to perform a task. Additionally, task-specific data may be gathered by robot 102. Robot 102 may utilize specific task data 212 for such purposes and, upon completion of a task, discard the data stored in specific task data 212. For example, a mapping of a home (e.g., a service location 104) is performed in order for robot 102 to complete a task. Once the task is complete, such information is unneeded and even presents a security risk. Accordingly, upon completion of the task, specific task data 212 is purged without affecting other data (e.g., data in data storage 210, memory 214, etc.).

Operating software 216 may provide an operating system, drivers, translators, and/or other information in order to facilitate robot 102 performing a task.

Task-specific instructions 218 may comprise task data or instructions. Task-specific instructions 218 may be dynamic and/or removable, such as to facilitate the ready reprogramming of robot 102 for a different task, functionality specific (e.g., operation of a particular sensor, robotic arm, imager, etc.).

Security 220 may provide monitoring, communication, and/or other security operations to protect robot 102 and/or persons, property, and data. Security 220 may ensure safe operation of robot 102. For example, even though a robotic arm is capable of moving at a given high rate of speed, security 220 may limit the speed to ensure safe operation of robot 102. Security 220 may comprise a number of computer protection means, including, but not limited to, anti-virus, communication encryption, theft detection, attack detection, unauthorized access, damage, uncertified hardware/software, suspicious activity, etc.

Communication (or "comm") management 224 provides operational features to enable robot 102 to utilize communication link 232. For example, communication management 224 may comprise a network interface card (nic), SIM card, and/or other networking components (e.g., 802.11n chipset, GSM chipset, LTE chipset, etc.). Communication link 232 may be provided via emitting/detecting equipment such as antennae, emitter/receiver, port, cable, and/or other communication hardware. Communication management 224 may comprise, alone or in concert with other components, safety and/or power management protocols. For example, communications management 224 may be providing high-definition audio and video to a contact center agent during the performance of a task. The agent may be monitoring a critical or sensitive subject of the task. Should the communication degrade, communications management 224 may throttle down (e.g., reduce resolution, frame rate, etc.) the quality of the video, terminate the audio, or take another action to ensure the agent is able to maintain some observational capability. In another embodiment, communications management 224 may veto a task to be performed by robot 102. Robot 102 may be performing a task that requires an acute observation, provided by a networked agent. If communications management 224 determines that the quality of communications is unsatisfactory, the task may be paused until a better communication link is established.

Communications management 224 may also provide channel management services. For example, robot 102 may be utilizing a public-access wireless network to communicate non-sensitive information (e.g., "heartbeat" signal, battery power remaining, etc.). However, for more sensitive information (e.g., images of service location 104, medical information, etc.) communications management 224 may establish a VPN or utilize a different channel (e.g., cellular network) for such information. Similarly, communications may fail or degrade on one channel and communications management 224 may establish or utilize another channel to help maintain communications.

Communications management 224 may provide more routine computational functions such as maintaining access credentials to networks, authorizing or denying access to robot 102 (e.g., physical or virtual service ports).

Processor 236 may provide general computing (e.g., arithmetic logic unit, graphical processing, etc.) and/or specific (e.g., image processing, gesture interpretation, etc.) for robot 102.

Figure 3:
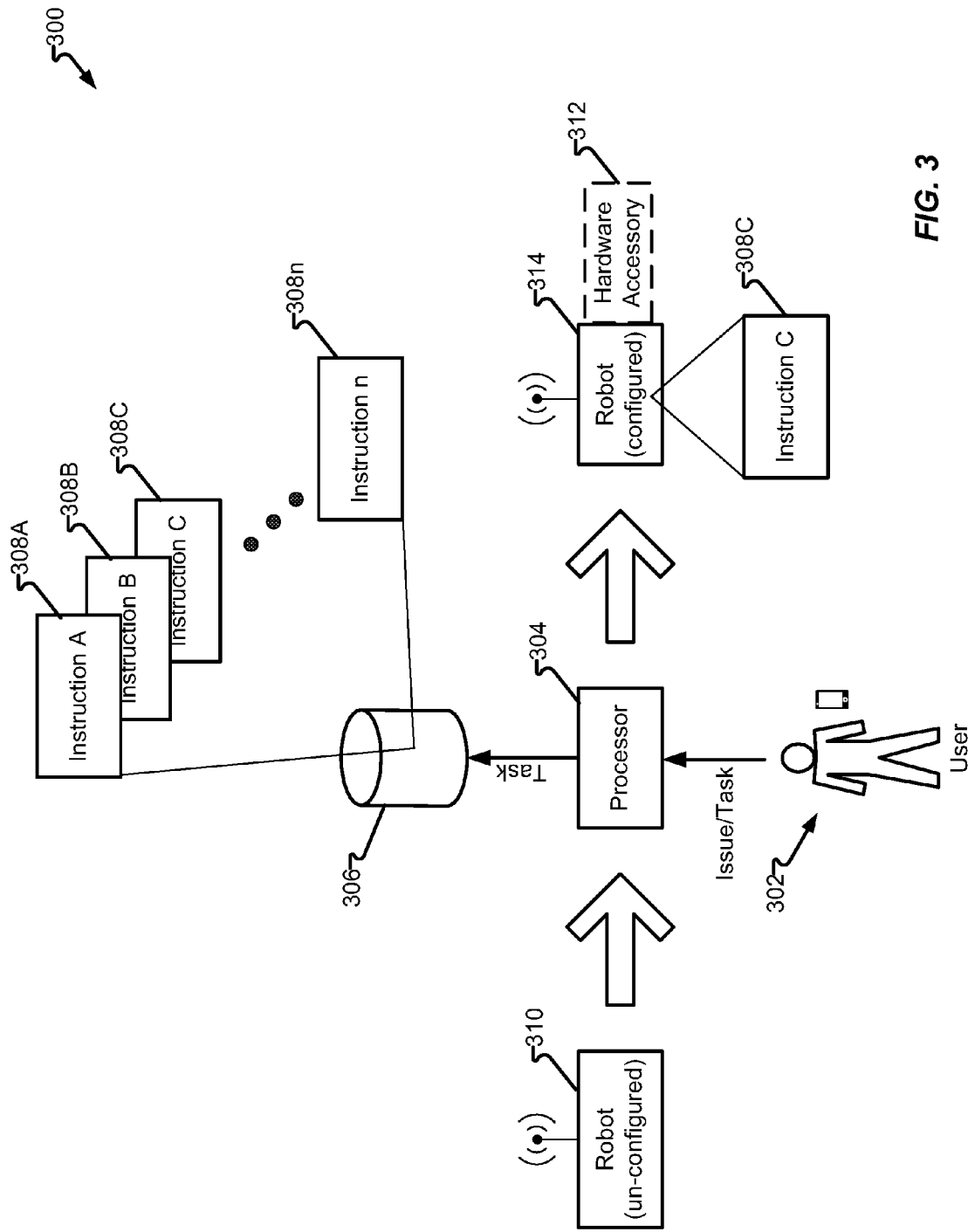
FIG. 3 depicts a second system in accordance with embodiments of the present disclosure.

FIG. 3 depicts system 300 in accordance with embodiments of the present disclosure. Configured robot 314 may be configured to perform a task or set of tasks from un-configured robot 310. Transformation of un-configured robot 310 to configured robot 314 is variously embodied. In one embodiment, user 302, alone or with benefit of an electronic communication device (e.g., smart phone, Internet connected computer, dedicated robot configuring device, etc.) provides processor 304 with an issue or task. In one embodiment, processor 304 may be a portion of a contact center, robot application store, local device, service provider, and/or other entity or enterprise. User 302 may provide processor 304 with a specific instruction, such as one of instructions 308A-n, requested or identify a task or issue to solve, whereby processor 304 determines the appropriate instruction.

In one embodiment, un-configured robot 310 requires software instructions and a hardware accessory in order to perform a particular task. User 302 provides the issue or task or specifies the instructions causing processor 304 to access data repository 306 comprising instructions 308. Processor 304 determines that instruction C (308C) is the appropriate instruction. Processor 304 then causes un-configured robot 310 to load instruction set 308C thereby causing robot 310 to become configured robot 314. Configured robot 314 may then be deployed for the performance of the task.

User 302 may own or otherwise control unconfigured robot 310. User 302 may install hardware accessory 312 and or instruction C (308C) directly or via request to processor 304. Processor 304 may determine the request requires unconfigured robot 310 to have (e.g., attached, installed, paired, available, in communication with, etc.) hardware accessory 312 to enable configured robot 314 to perform the task. Processor 304 may then instruct a party, such as installer, user 302, or other party to obtain and install hardware accessory 312 into un-configured robot 310 in order to transform un-configured robot 310 into configured robot 314. In another embodiment, such as when user 302 does not have direct access to un-configured robot 310, processor 304 may cause a provisioning entity to access robot 310 install hardware accessory 312 and/or instruction C (308C) to make configured robot 314 available for the performance of the task. In yet another embodiment, the selected instruction, such as instruction C (308C), may be provided to un-configured robot 310 as part of the installation of hardware accessory 312.

Processor 304 may cause or perform certain pre-provisioning, provisioning, pre-deployment, deployment, and/or post-deployment procedures, such as to help ensure the security of configured robot 314, user 302, a service area such as service area 104, and other persons, property, and data. In one embodiment, processor 304 causes un-configured robot 310 to be purged of any nonessential data, hardware, and/or software. Processor 304 may also perform the capabilities assessment, such as to ensure un-configured robot 310, once configured to become configured robot 314, would be capable of performing the task provided to it by user 302 and associated processor 304. In another embodiment, processor 304 may insure the presence of security and/or safety components, including, but not limited to, safety shutoff, antivirus software, location finding components, etc. Additionally, processor 304 may verify other operational characteristics of un-configured robot 310 and/or configured robot 314, such as to ensure configured robot 314 is operating within acceptable performance parameters. For example, processor 304 may ensure that movements are as expected, for example to ensure that a robotic arm is not bent, that sensors are operating as expected, and/or other operational needs of robot 314 are acceptable. Accordingly, un-configured robot 310 or configured robot 314 may be exercised and observed by components internal to un-configured robot 310 or configured robot 314 or external thereto.

Should configured robot 314, or un-configured robot 310 once configured, be determined to be unsuitable or unable to performance the task, processor 304 may attempt to provision a different configured robot 314, dispatch a human agent, or notify user 302 that the task is not able to be performed by a robot and/or seek a different means to perform the task.

FIGS. 4A-4D depict systems comprising robot 102 and instructions 410 selected to configure robot 102 into a task-specific robot. The location of instructions 410 are variously embodied and may enable robot 102 to operate autonomously without any further human involvement. Instructions 410 may be placed on various components accessible to robot 102 as a matter of convenience or as a matter of performance or practicality. For example, instructions 410 may require a number of human inputs, such as preferences, and by locating instructions 410 on a user device (See, FIG. 4B) the user may be presented with detailed graphics or other means by which to make a determination and input their preferences. In another embodiment, the potential set of instructions 410 may be too large to load internally to robot 102; accordingly, various associated components may be provided with instructions 410 to be selectively available to robot 102. For example, robot 102 may be configured to perform a task that has a decision and based on the occurrence of an event, executes one very large file or a second very large file. The problem compounds if there are many path options that may be encountered and many large files. Accordingly, instructions 410, in whole or in part, may be maintained outside of robot 102.

While instructions 102 may be machine instructions and stored as binary data, the media encompassing instructions 410 is variously embodied. While a data download may provide instructions 410 directly to internal storage or memory of robot 410, other media (e.g., magnetic, optical, PROM, ePROM, fPROM, USB memory stick, proprietary media, etc.) may embody instructions 410 and be made available to robot 102.

Figure 4A:
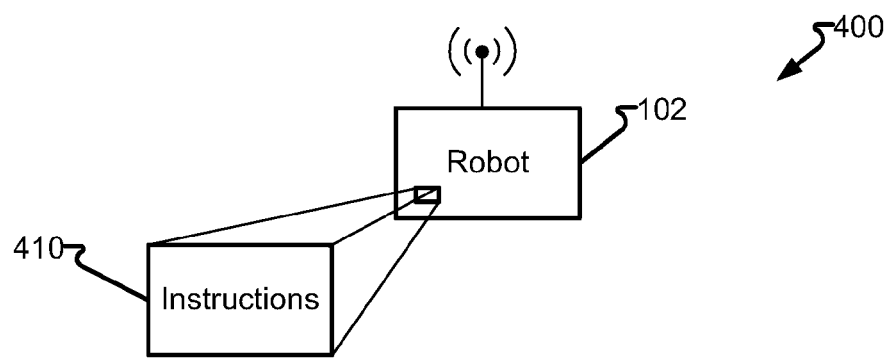
FIG. 4A depicts a first system comprising instructions in accordance with embodiments of the present disclosure.

FIG. 4A depicts system 400 comprising instructions in accordance with embodiments of the present disclosure. In one embodiment, robot 102 comprises instructions 410 located with (e.g., data storage 210, specific task data 212, memory 214, task-specific instructions 218, and/or other storage medium).

Figure 4B:
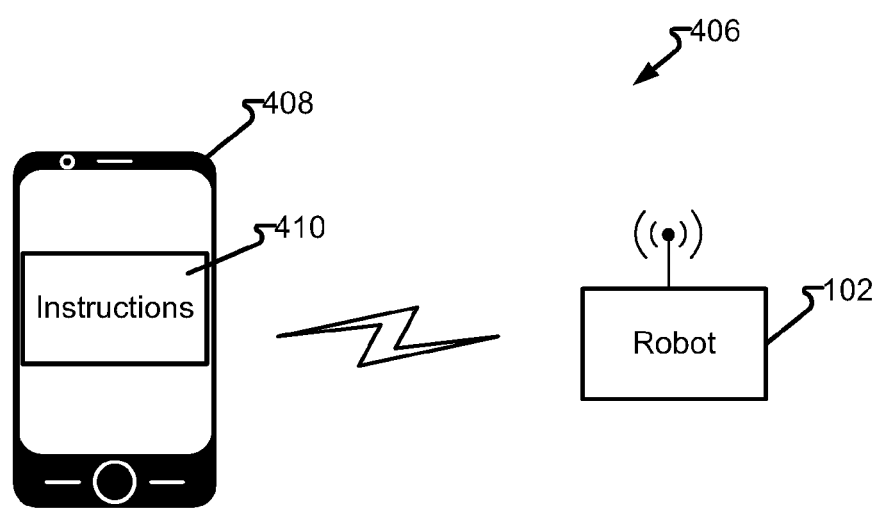
FIG. 4B depicts a second system comprising instructions in accordance with embodiments of the present disclosure.

FIG. 4B depicts system 406 comprising instructions in accordance with embodiments of the present disclosure. In one embodiment, device 408 comprises instructions 410 accessed by robot 102. Robot 102 may be in communication with device 408 via wired or wireless communications and executing instructions directly retrieved from device 408 and/or downloading at least a portion of instructions 410 for execution. In another embodiment, at least a portion of instructions 410 comprise inputs and/or outputs for human operator of device 408. Device 408 may be local, such as within service area 104, to robot 102. In another embodiment, device 408 may be a significant distance from robot 102, such as via communication incorporating the Internet, cellular network, telephone network, and/or other network.

Figure 4C:
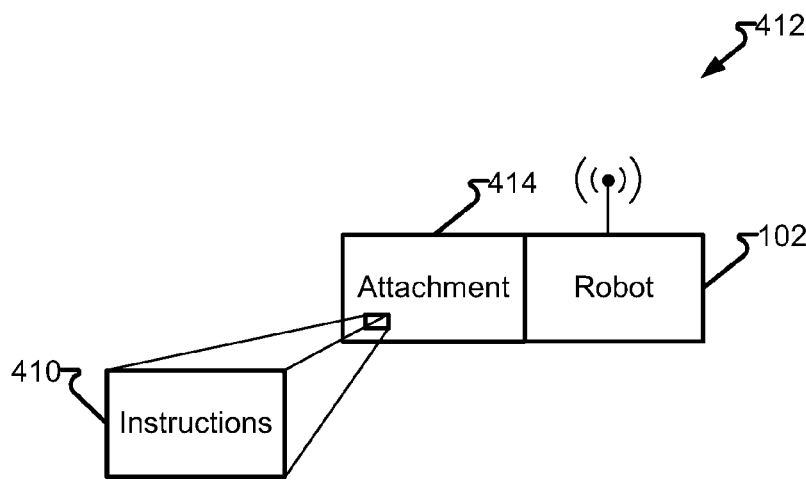
FIG. 4C depicts a third system comprising instructions in accordance with embodiments of the present disclosure.

FIG. 4C depicts system 412 comprising instructions in accordance with embodiments of the present disclosure. In one embodiment, attachment 414 comprises instructions 410 for execution by robot 102. Attachment 414 may comprise a physical capability provider for robot 102, such as mobility/actuator 226, sensor 228, I/O device 230, communication link 232, and/or other component.

Figure 4D:
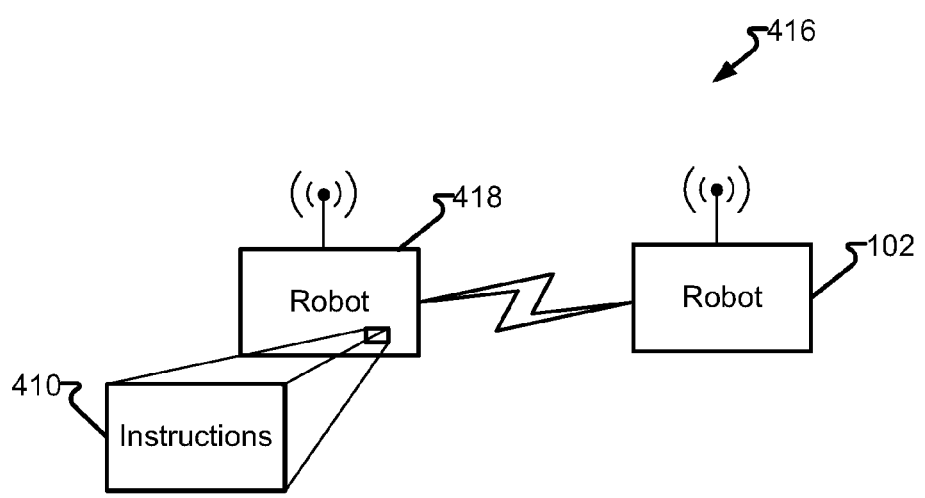
FIG. 4D depicts a fourth system comprising instructions in accordance with embodiments of the present disclosure.

FIG. 4D depicts system 416 comprising instructions in accordance with embodiments of the present disclosure. Robot 418 comprises instructions 410 for execution by robot 102. Robot 418 may be a supervisor robot on-site or remotely located or one of a plurality of robots, including robot 102, deployed for the performance of a task. In a further option, robot 418 may be solely provided for the purpose of maintaining instructions 410 for use by robot 102.

Figure 5A:
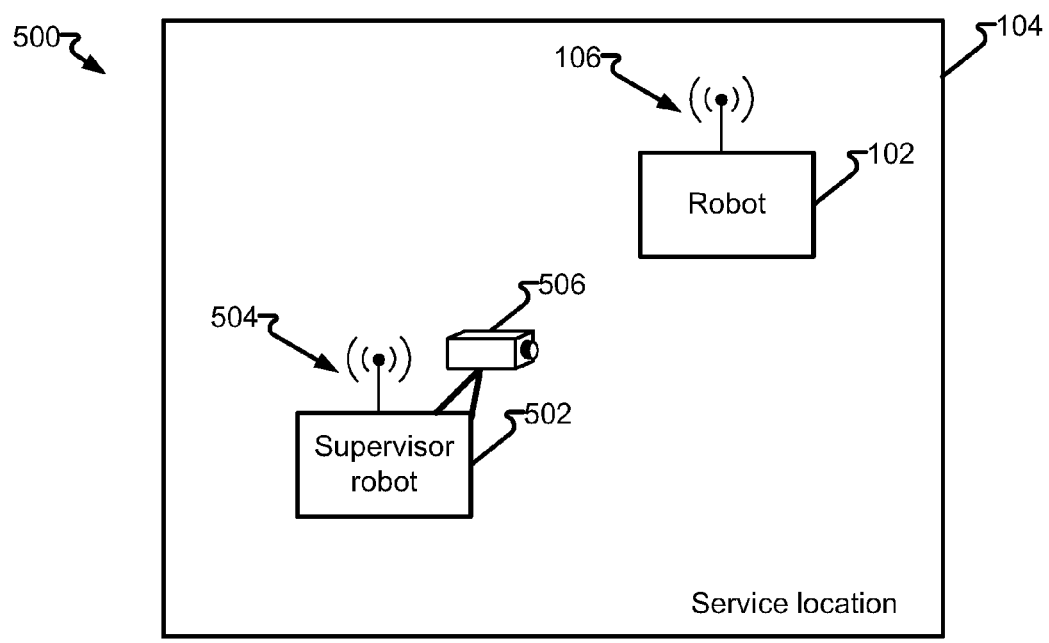
FIG. 5A depicts a first multiple robot system in accordance with embodiments of the present disclosure.

FIG. 5A depicts multiple robot system 500 in accordance with embodiments of the present disclosure. In one embodiment, service location 104 comprises a plurality of robots engaged in single or disparate tasks. In one embodiment, supervisor robot 502 is provided within service location 104 for the purposes of monitoring robot 102. Supervisor robot 502 may communicate with robot 102 and/or other devices via antenna 504 and associated communication hardware. Additionally, supervisor robot 502 may provide observational supervision such as via camera 506, or other input device (e.g., microphone, radar, etc.). Supervisor robot 502 may determine robot 102 is operating outside of expected parameters, unsafely, unsecurely, or otherwise represents a hazard to itself, supervisor robot 502, persons, property, and/or data.

Supervisor robot 502 may monitor data exchanged or be a conduit for communications to and from robot 102 and monitoring the content thereof. Should robot 102 attempt to provide confidential information, supervisor robot 502 may block the transmission and may further identify robot 102 is compromised. If compromised, robot 102 on its own accord or via command from supervisor robot 502 may cause robot 102 to shut down, discontinue certain operations, enter a safe state, or otherwise take action to mitigate the security risk. Similarly supervisor robot 502 may observe robot 102 performing abnormally or unexpectedly. As a result, supervisor robot 502 may cause robot 102 to change operations, notify an operator, or discontinue performing the operation.

Supervisor robot 502 may monitor a plurality of robots 102 such as to ensure proper coordination of physical activities. For example, robot 102 and a number of peer robots may be attempting to lift four corners of an object uniformly. Supervisor robot 502 may monitor each of robots 102 and the number of peer robots and/or the object being lifted to ensure coordination or take appropriate action if coordination is not evident to the degree expected.

In another embodiment, supervisor robot 502 may be remotely located and outside of service location 104. For example supervisor robot 502 may be outside of a home providing a communication link to robot 102 via short-term communication protocol (e.g., Bluetooth) while supervisor robot 502 communicates with another component via a different network, such as a long-range network utilizing the Internet, cellular telephones, satellite link, etc., supervisor robot 502 may also be located within a contact center or other service provider.

Figure 5B:
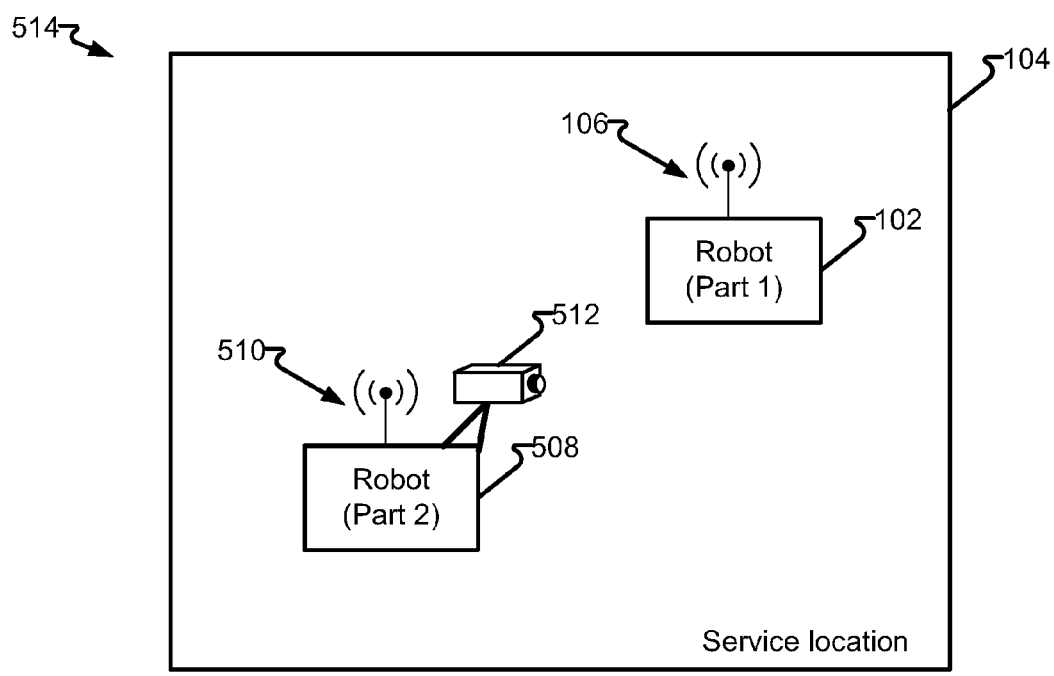
FIG. 5B depicts a second multiple robot system in accordance with embodiments of the present disclosure.

FIG. 5B depicts a second multiple robot system 514 in accordance with embodiments of the present disclosure. In one embodiment, a plurality of robots 102 is provided for the performance of the task. For example, robot 102 may form part one of a two-robot team further comprising robot 508. Robot 508 and robot 102 may communicate via radio frequency communications, such as via antennas 510 and 106 or other communication device. Additionally, one or more of robots 102 and robot 508 may comprise a camera 512 or other observational monitoring device as a means of coordination of efforts between robot 102 and robot 508. Robots 102 and 508 may be working in concert to perform a single task (e.g., team lift), the same task with respect to different objects to divide the labor (e.g., each mowing a portion of a field), or different components of the same task (e.g., one operating a motor, the other performing an action with the motor causes an object to be correctly positioned).

Communication to other entities may be provided individually by robot 508 and robot 102, or one of robot 508 and robot 102 may serve as a proxy for the other. In yet another embodiment, robot 508 may comprise supervisor robot 502 (See, FIG. 5A).

Figure 6:
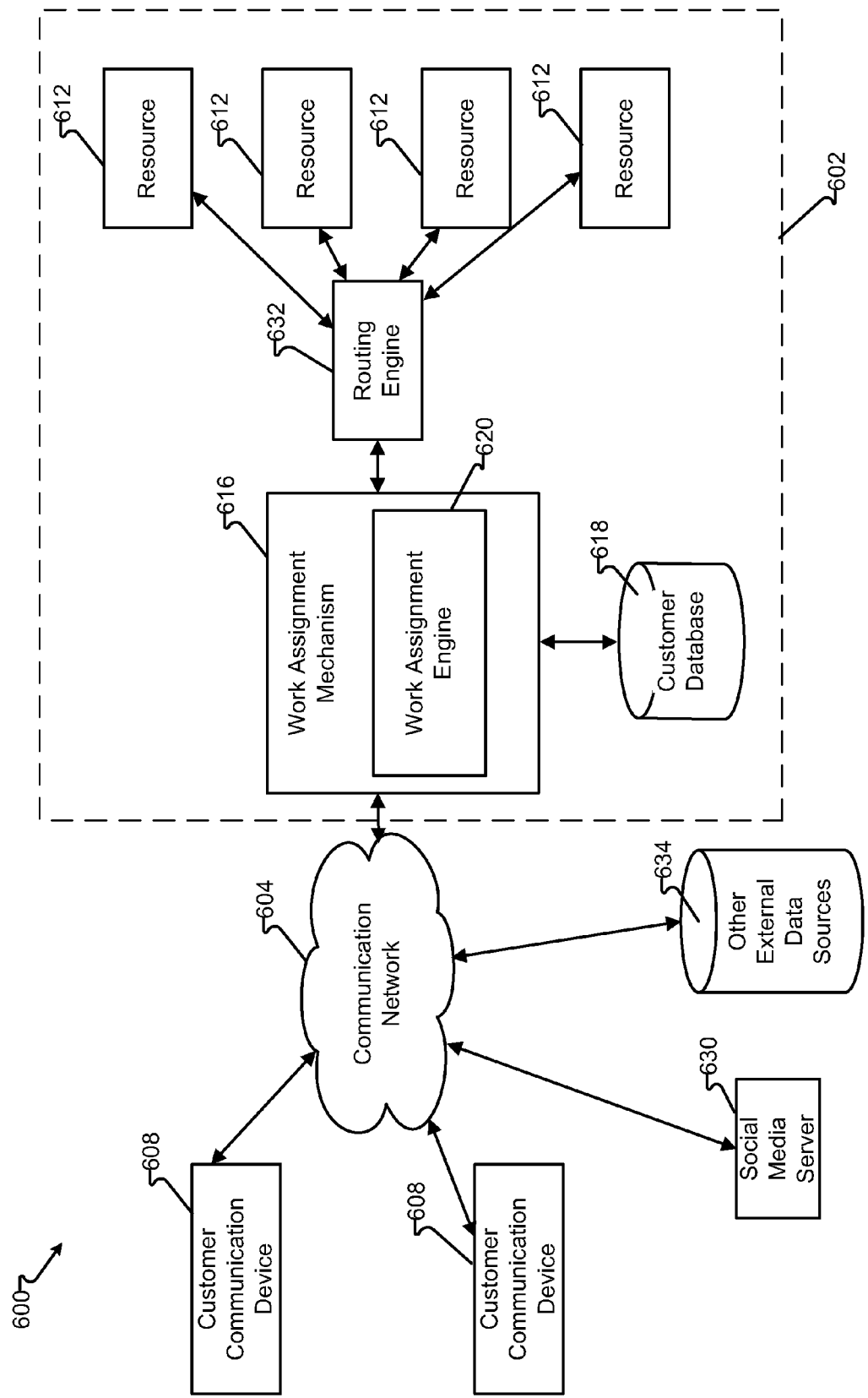
FIG. 6 depicts a contact center system in accordance with embodiments of the present disclosure.

With reference now to FIG. 6, communication system 600 is discussed in accordance with at least some embodiments of the present disclosure. The communication system 600 may be a distributed system and, in some embodiments, comprises a communication network 604 connecting one or more communication devices 608 to a work assignment mechanism 616, which may be owned and operated by an enterprise administering contact center 602 in which a plurality of resources 612 is distributed to handle incoming work items (in the form of contacts) from customer communication devices 608.

Contact center 602 is variously embodied to receive and/or send messages that are or are associated with work items and the processing and management (e.g., scheduling, assigning, routing, generating, accounting, receiving, monitoring, reviewing, etc.) of the work items by one or more resources 612. The work items are generally generated and/or received requests for a processing resource 612 embodied as, or a component of, an electronic and/or electromagnetically conveyed message. Contact center 602 may include more or fewer components than illustrated and/or provide more or fewer services than illustrated. The border indicating contact center 602 may be a physical boundary (e.g., a building, campus, etc.), legal boundary (e.g., company, enterprise, etc.), and/or logical boundary (e.g., resources 612 utilized to provide services to customers for a customer of contact center 602).

Furthermore, the border illustrating contact center 602 may be as-illustrated or, in other embodiments, include alterations and/or more and/or fewer components than illustrated. For example, in other embodiments, one or more of resources 612, customer database 618, and/or other component may connect to routing engine 632 via communication network 604, such as when such components connect via a public network (e.g., Internet). In another embodiment, communication network 604 may be a private utilization of, at least in part, a public network (e.g., VPN); a private network located, at least partially, within contact center 602; or a mixture of private and public networks that may be utilized to provide electronic communication of components described herein. Additionally, it should be appreciated that components illustrated as external, such as social media server 630 and/or other external data sources 634 may be within contact center 602 physically and/or logically, but still be considered external for other purposes. For example, contact center 602 may operate social media server 630 (e.g., a website operable to receive user messages from customers and/or resources 612) as one means to interact with customers via their customer communication device 608.

Customer communication devices 608 are embodied as external to contact center 602 as they are under the more direct control of their respective user or customer. However, embodiments may be provided whereby one or more customer communication devices 608 are physically and/or logically located within contact center 602 and are still considered external to contact center 602, such as when a customer utilizes customer communication device 608 at a kiosk and attaches to a private network of contact center 602 (e.g., WiFi connection to a kiosk, etc.), within or controlled by contact center 602.

It should be appreciated that the description of contact center 602 provides at least one embodiment whereby the following embodiments may be more readily understood without limiting such embodiments. Contact center 602 may be further altered, added to, and/or subtracted from without departing from the scope of any embodiment described herein and without limiting the scope of the embodiments or claims, except as expressly provided.

Additionally, contact center 602 may incorporate and/or utilize social media server 630 and/or other external data sources 634 may be utilized to provide one means for a resource 612 to receive and/or retrieve contacts and connect to a customer of a contact center 602. Other external data sources 634 may include data sources, such as service bureaus, third-party data providers (e.g., credit agencies, public and/or private records, etc.). Customers may utilize their respective customer communication device 608 to send/receive communications utilizing social media server 630.

In accordance with at least some embodiments of the present disclosure, the communication network 604 may comprise any type of known communication medium or collection of communication media and may use any type of protocols to transport electronic messages between endpoints. The communication network 604 may include wired and/or wireless communication technologies. The Internet is an example of the communication network 604 that constitutes an Internet Protocol (IP) network consisting of many computers, computing networks, and other communication devices located all over the world, which are connected through many telephone systems and other means. Other examples of the communication network 604 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 604 need not be limited to any one network type and instead may be comprised of a number of different networks and/or network types. As one example, embodiments of the present disclosure may be utilized to increase the efficiency of a grid-based contact center 602. Examples of a grid-based contact center 602 are more fully described in U.S. Patent Publication No. 2010/0296417 to Steiner, the entire contents of which are hereby incorporated herein by reference. Moreover, the communication network 604 may comprise a number of different communication media, such as coaxial cable, copper cable/wire, fiber-optic cable, antennas for transmitting/receiving wireless messages, and combinations thereof.

The communication devices 608 may correspond to customer communication devices. In accordance with at least some embodiments of the present disclosure, a customer may utilize their communication device 608 to initiate a work item. Illustrative work items include, but are not limited to, a contact directed toward and received at a contact center 602, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 604. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 616, but rather may be on some other server in the communication network 604 where it is harvested by the work assignment mechanism 616, which generates a work item for the harvested communication, such as social media server 630. An example of such a harvested communication includes a social media communication that is harvested by the work assignment mechanism 616 from a social media network or server 630. Exemplary architectures for harvesting social media communications and generating work items based thereon are described in U.S. patent application Ser. Nos. 12/784,369, 12/706,942, and Ser. No. 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 608 and the format of the communication. In particular, work items are logical representations within a contact center 602 of work to be performed in connection with servicing a communication received at contact center 602 (and, more specifically, the work assignment mechanism 616). The communication may be received and maintained at the work assignment mechanism 616, a switch or server connected to the work assignment mechanism 616, or the like, until a resource 612 is assigned to the work item representing that communication. At which point, the work assignment mechanism 616 passes the work item to a routing engine 632 to connect the communication device 608, which initiated the communication, with the assigned resource 612.

Although the routing engine 632 is depicted as being separate from the work assignment mechanism 616, the routing engine 632 may be incorporated into the work assignment mechanism 616 or its functionality may be executed by the work assignment engine 620.

In accordance with at least some embodiments of the present disclosure, the communication devices 608 may comprise any type of known communication equipment or collection of communication equipment. Examples of a suitable communication device 608 include, but are not limited to, a personal computer, laptop, Personal Digital Assistant (PDA), cellular phone, smart phone, telephone, or combinations thereof. In general, each communication device 608 may be adapted to support video, audio, text, and/or data communications with other communication devices 608 as well as the processing resources 612. The type of medium used by the communication device 608 to communicate with other communication devices 608 or processing resources 612 may depend upon the communication applications available on the communication device 608.

In accordance with at least some embodiments of the present disclosure, the work item is sent toward a collection of processing resources 612 via the combined efforts of the work assignment mechanism 616 and routing engine 632. The resources 612 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 602.

As discussed above, the work assignment mechanism 616 and resources 612 may be owned and operated by a common entity in a contact center 602 format. In some embodiments, the work assignment mechanism 616 may be administered by multiple enterprises, each of which has its own dedicated resources 612 connected to the work assignment mechanism 616.

In some embodiments, the work assignment mechanism 616 comprises a work assignment engine 620, which enables the work assignment mechanism 616 to make intelligent routing decisions for work items. In some embodiments, the work assignment engine 620 is configured to administer and make work assignment decisions in a queueless contact center 602, as is described in U.S. patent application Ser. No. 12/882,950, the entire contents of which are hereby incorporated herein by reference. In other embodiments, the work assignment engine 620 may be configured to execute work assignment decisions in a traditional queue-based (or skill-based) contact center 602.

The work assignment engine 620 and its various components may reside in the work assignment mechanism 616 or in a number of different servers or processing devices. In some embodiments, cloud-based computing architectures can be employed whereby one or more components of the work assignment mechanism 616 are made available in a cloud or network such that they can be shared resources among a plurality of different users. Work assignment mechanism 616 may access customer database 618, such as to retrieve records, profiles, purchase history, previous work items, and/or other aspects of a customer known to contact center 602. Customer database 618 may be updated in response to a work item and/or input from resource 612 processing the work item.

It should be appreciated that one or more components of contact center 602 may be implemented in a cloud-based architecture in their entirety, or components thereof (e.g., hybrid), in addition to embodiments being entirely on-premises. In one embodiment, customer communication device 608 is connected to one of resources 612 via components entirely hosted by a cloud-based service provider, wherein processing and data storage elements may be dedicated to the operator of contact center 602 or shared or distributed amongst a plurality of service provider customers, one being contact center 602.

In one embodiment, a message is generated by customer communication device 608 and received, via communication network 604, at work assignment mechanism 616. The message received by a contact center 602, such as at the work assignment mechanism 616, is generally, and herein, referred to as a "contact." Routing engine 632 routes the contact to at least one of resources 612 for processing.

In another embodiment, at least one of resource 612 maybe "robot qualified" and possess the skills to interact with a robot, such as robot 102, and/or devices and personnel associated with robot 102. Resource 612 maybe automated, human, and/or a combination thereof. Resource 612 may instruct, operate, and/or supervise robot 102 or the coordination of robot 102 with other robots, devices, and personnel. In yet another embodiment, resource 612 may qualify, provision, certify/verify, audit, dispatch, retrieve, de-provision, and/or other logistical operation for robot 102, instructions, and/or hardware required for robot 102 to perform a task without undue risk to persons, property, or data.

Figure 7:
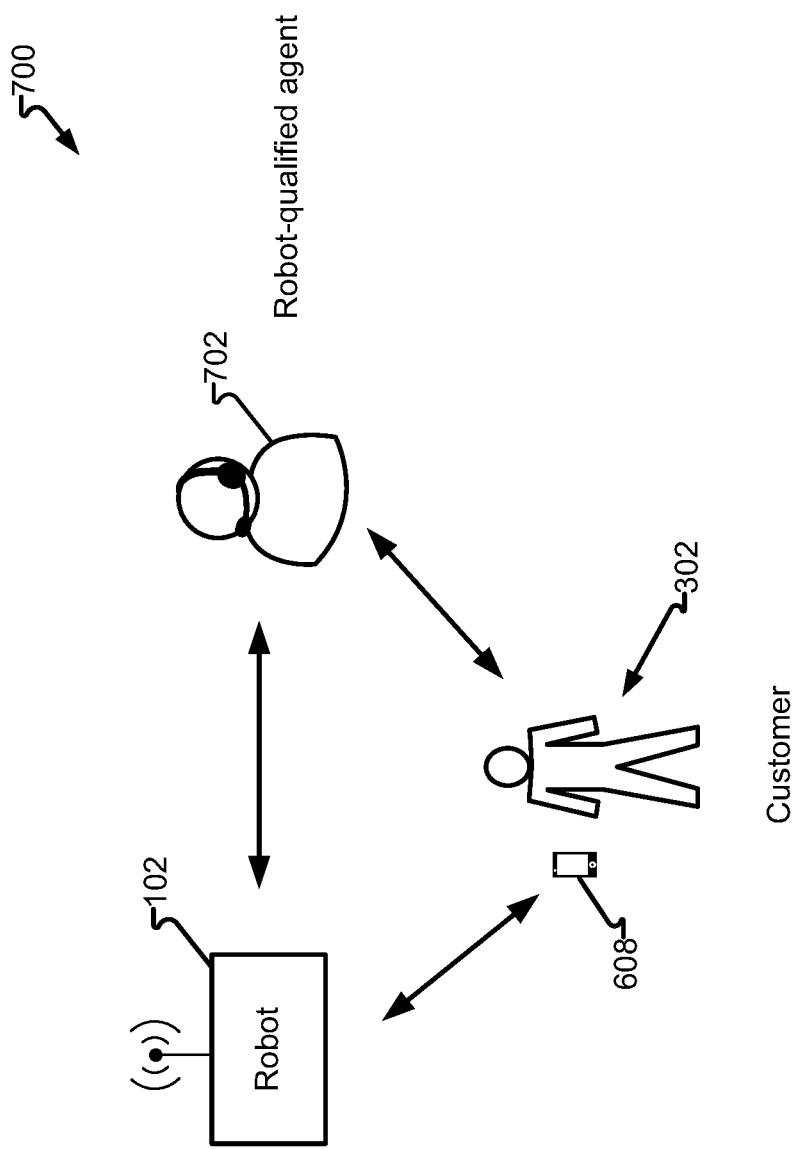
FIG. 7 depicts a first communication system in accordance with embodiments of the present disclosure.

FIG. 7 depicts communication system 700 in accordance with embodiments of the present disclosure. Communication system 700 generally comprises portions of communication system 600, and/or other device-device and device-human communication components, which are omitted for the sake of avoiding unnecessarily complicating the figure. Generally, communication system 700 comprises three nodes which may be, or be at least capable of, communication at the same or different times. In one embodiment, customer 302, which may be utilizing customer communication device 608, is enabled to communicate with contact center 602 and robot-qualified agent 702. Robot-qualified agent 702 comprises at least one of resource 612 having been designated as qualified as having skills related to robots and/or resolving customer service requests by utilizing robotic agents, such as robot 102.

In one embodiment, customer 302 communicates with robot 102 directly and natively. For example, customer 302 communicates to robot 102 by speaking and/or gesturing. As a result, robot 102, for example utilizing I/O device 230 when embodied as a microphone, hears spoken commands or other information provided by customer 302. Similarly I/O device 230, when embodied as a camera, may see customer 302 gesture to issue commands. Gestured commands, natively, may include, but are not limited to, pointing, looking (e.g., eye position), facial expression, waving, sign language, body position, interacting (e.g., pointing, touching, holding, looking, moving, etc.) with an object other than robot 102, physical activity (e.g., running, walking, sitting, standing, etc.), location/orientation (e.g., present in a location having a meaning different than if present in another location, arm position, leg position, etc.), attire, proximity to another human, physical interaction with another human, identity of a proximate other human, role of a proximate other human, and/or other observable human trait, attribute, or behavior.

In another embodiment, customer 302 communicates with robot 102 directly and non-natively. For example, customer 302 may utilize a smart phone or personal computer with a communications link with robot 102 to enable customer 302 to communicate with robot 102. In another embodiment, customer 302 may communicate with robot 102 via an I/O device 230 when embodied as a keypad, button, dial, mouse, touchpad, etc. Additionally, customer 302 may communicate with robot 302 via manipulation of a component in communication with sensor 228 and/or I/O device 230. For example, customer 302 may push robot 102 to convey a command to move, move an arm or other component of robot 102 to cause robot 102 to go to or interact with to an item of interest or perform a desired action. Customer 302 may point (e.g., hand and/arm gesture, eye gesture, etc.) or utilize a pointing device (e.g., stick, cane, laser pointer, etc.) to convey a particular item or location to robot 102 observing customer 302 and/or the pointing device, or an output therefrom, via a camera and/or other I/O device 230.

Customer 302 may communicate with robot-qualified agent 702 via a customer communication device 608. Robot 102 may communicate with robot-qualified agent 702 via a customer communication device 608. Each of customer 302, robot 102, and robot-qualified agent 702 may serve as communication link for the other two. For example, robot-qualified agent 702 and customer 302 may communicate via robot 102, customer 302 and robot 102 may be in communication via robot-qualified agent 702 and/or at least one component of contact center 602, or robot 102 and robot-qualified 702 and/or at least one component of contact center 602 may be in communication via customer 302 and/or customer communication device 608.

In another embodiment, robot 102 may be supervised via one or both of customer 302 and robot-qualified agent 702. Supervision may include being observed, overriding an action, stopping an action, halting an action until permission is granted, emergency shut-down, and/or scuttling robot 102. Scuttling robot 102 may comprise a purging of all data gathered with respect to customer 302 and/or service location 104, the entirety of all volatile memory of robot 102, or the circuitry and data of robot 102 (e.g., such as application of a voltage designed to destroy operations of at least some circuitry, electromagnetic pulse, and/or other means to "brick" robot 102 and render it inoperable and/or devoid of some or all data).

In another embodiment, at least one of customer 302, robot-qualified agent 702, and robot 102 must be authenticated to at least one of the others of customer 302, robot-qualified agent 702, and robot 102. Absent authentication, robot 102 may be disabled entirely, disabled with respect to a particular task, purged of task-specific data and/or instructions, or other action selected for unauthorized parties. Robot 102 may seek to authenticate customer 302 to ensure a person attempting to utilize robot 102 is an authorized party. Robot 102 may ask for a username, password, biometric information, non-verbal password, and/or other input which is designed to be provided only by the authorized party. A non-verbal password may be a gesture of the human or interaction with robot 102. For example, a non-verbal password may comprise the human touching a contact-sensitive portion of an arm of robot 102, then crossing their arms, and then moving the arm of robot 102 in a circle. Robot 102 may evaluate the authentication attempt directly and/or utilize robot-qualified agent 702 and/or other resource of contact center 602.

In another embodiment, robot 102 is authenticated to robot-qualified agent 702 and/or other resource of contact center 602. For example, robot 102 may be selected to receive an instruction, such as one of instructions 308, after customer 302 purchased such instructions thereby enabling robot 102 to perform a task. Customer 302 may have provided robot-qualified agent 702 and/or other resource 612 of contact center 602 with a unique indicia identifying robot 102. Upon robot 102 being authenticated to robot-qualified agent 702 and/or other resource 612 of contact center 602, the instructions 308 are provided to robot 102 and/or activated.

Figure 8:
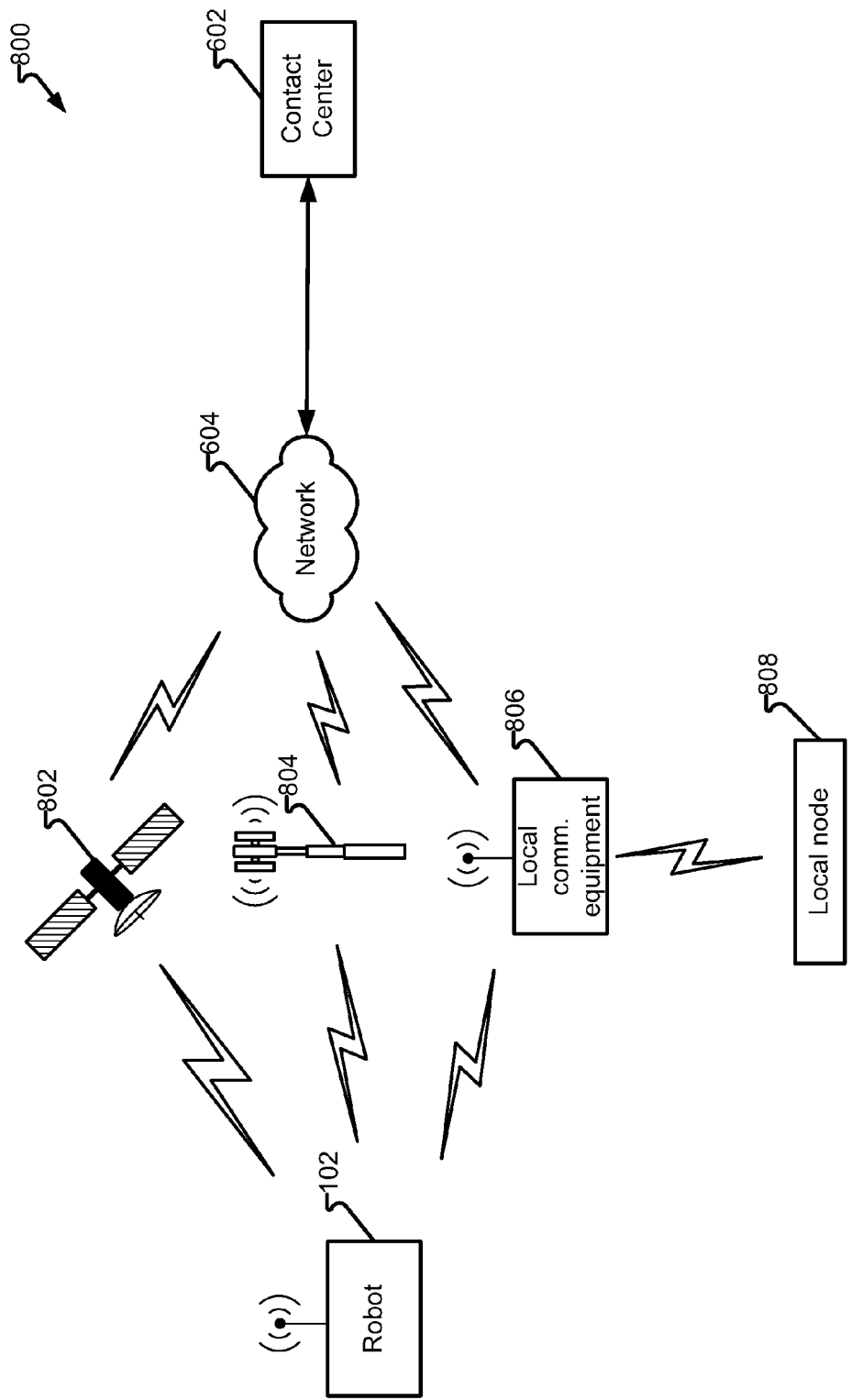
FIG. 8 depicts a second communication system in accordance with embodiments of the present disclosure.

FIG. 8 depicts communication system 800 in accordance with embodiments of the present disclosure. In one embodiment, robot 102 communicates with contact center 602, and optionally robot-qualified agent 702, via network 604. As a part of, or link to network 604, robot 102 may utilize one or more of satellite 802, cellular tower 804, local equipment 806, and/or other available network or network component. In one embodiment, local communication equipment 806 comprises equipment providing communication services to/from robot 102 while robot 102 is at service location 104, dispatched to a public site, private site open to the public, private site authorized to be accessed by robot 102, or other location having communication equipment 806 usable by robot 102 when in or proximate to the location.

In another embodiment, local node 808 may comprise a computer, smart phone, tablet computer, storage device, output device, node on a different network, and/or other communication device comprising a node to local communication equipment 806. In one embodiment, local node 808 may be a monitor for communication between robot 102 and contact center 602 utilizing local communication equipment 806. Monitoring may be passive, wherein a user of local node 808 merely observes such communications, or active, wherein a user of local node 808 may authorize, deny authorization, provide input, interact with robot 102, and/or interact with contact center 602 via local node 808.

Figure 9:
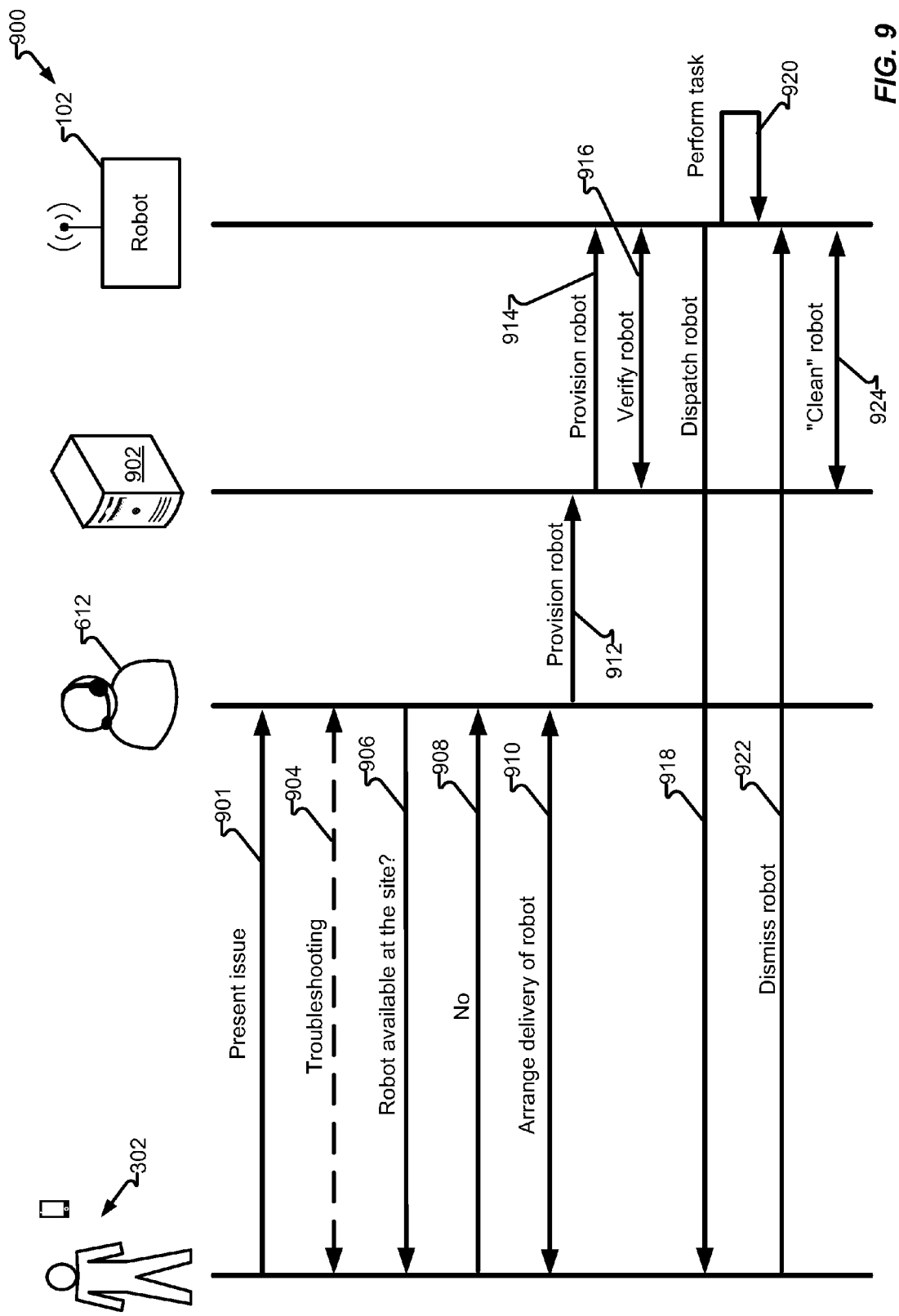
FIG. 9 depicts a first interaction in accordance with embodiments of the present disclosure.

FIG. 9 depicts interaction 900 in accordance with embodiments of the present disclosure. Customer 302 may have a customer service need and interact with contact center 602 to address the need. To avoid unnecessarily complicating the figure, portions of contact center 602 are omitted. In one embodiment, customer 302 initiates contact to request a service from agent 612. In one embodiment, agent 612 is a human agent. In another embodiment, agent 612 is an automated agent. In yet another embodiment, agent 612 comprises portions of a human and portions of a automated agent, such as when a human agent presents or approves a recommendation of an automated agent, a human agent presents or receives information from robot 102 translated into a human-readable language understood by human agent 612. For example, a robot may provide a machine signal (e.g., "ARM1:x=235, y=0, z=183; 15 deg/sec; 3 Newton/meters") to an automated counterpart of agent 612, which may translate such information and present "arm positioned and turning—low force, low speed" to human counterpart of agent 612 who does not require technical specifics. As a further option, the words (herein presented in English) may be further translated into a language understood by the human counterpart of agent 612.

In one embodiment, step 901 presents an issue to agent 612 from customer 302. Optionally, step 904 may comprise troubleshooting techniques, which may be performed by customer 302 and instructed by agent 612 (e.g., "Have you tried turning it off and on again?" "Check the connector," etc.). Agent 612 may determine that a robot may be able to perform a task to resolve the issue presented in step 901 and/or discovered during other interaction between customer 302 and agent 612.

Steps 906 and 908 determine that a robot is not available at the location, such as service location 104, to perform a task requiring a physical action at the location. Customer 302 and agent 612 arrange for delivery of a robot at step 910. Next, agent 612 signals server 902 to provision robot 102 in order to perform the task. Server 902 performs provisioning step 912 of robot 102.

Provisioning of robot 102 in step 914 is variously embodied. In one embodiment, robot 102 may be already provisioned to perform the task and step 916 merely performs a verification that robot 102 is "alive" and available to be dispatched to perform the task. In another embodiment, robot 102 lacks the instructions and/or hardware to perform the task and provisioning comprises loading instructions and/or hardware to robot 102 (See, FIG. 3).

Provisioning step 914 may comprise additional efforts to ensure the safety of persons, property, and data. In one embodiment, step 914 provides a "cleaning" process to ensure that robot 102 does not possess unwanted, foreign, unexplained, and/or uncertified code, instructions, settings, etc. Verification step 916 may be provided to validate robot 102. In another embodiment, step 914 provides additional instructions, data, and/or security hardware to robot 102. For example, a "kill" switch, third-party monitoring/auditing software, anti-virus software, encryption, and/or other hardware and/or software may be provided to ensure robot 102 operates as expected without undue risk to persons, property, or data. Step 916 may ensure robot is property configured to perform the task and maintain safety and security. Once step 916 has been completed, robot 102 is ready to be dispatched.

Step 918 dispatches robot 102 to the location of the task, such as service location 104. Dispatch step 918 may comprise shipping robot 102 via freight carrier (e.g., postal service, private courier, etc.), human delivery agent, and/or automated delivery agent. For example, robot 102 may be self propelled and able to navigate to service location autonomously or via a delivery robot (e.g., self-driving car, etc.). Robot 102 then performs task at step 920. Once the task is complete, customer 302 dismisses 922 robot 102. As a further option, agent 612 and/or robot 102, itself, may dismiss robot 102. It should be appreciated that a task is complete when the task has been successfully or unsuccessfully concluded. For example, an additional problem, mistake, failure, or other issue may cause a task to be completed unsuccessfully, wherein another means of performing the task (e.g., different robot, human service agent, abandonment of the task, etc.) may be performed.

Upon completion of the task, data collected by robot 102, and optionally specialized instructions utilized to perform the task, may be purged as a component of cleaning robot 102 at step 924. Step 924 may further comprise charging batteries, removing any specialized hardware or software installed during provisioning step 914. Task- or site-specific data gathered by robot 102 may be purged. Step 924 may further comprise allowing a third-party to verify and/or audit robot 924 to ensure it is "cleaned" to a level determined by a previously established protocol.

Figure 10:
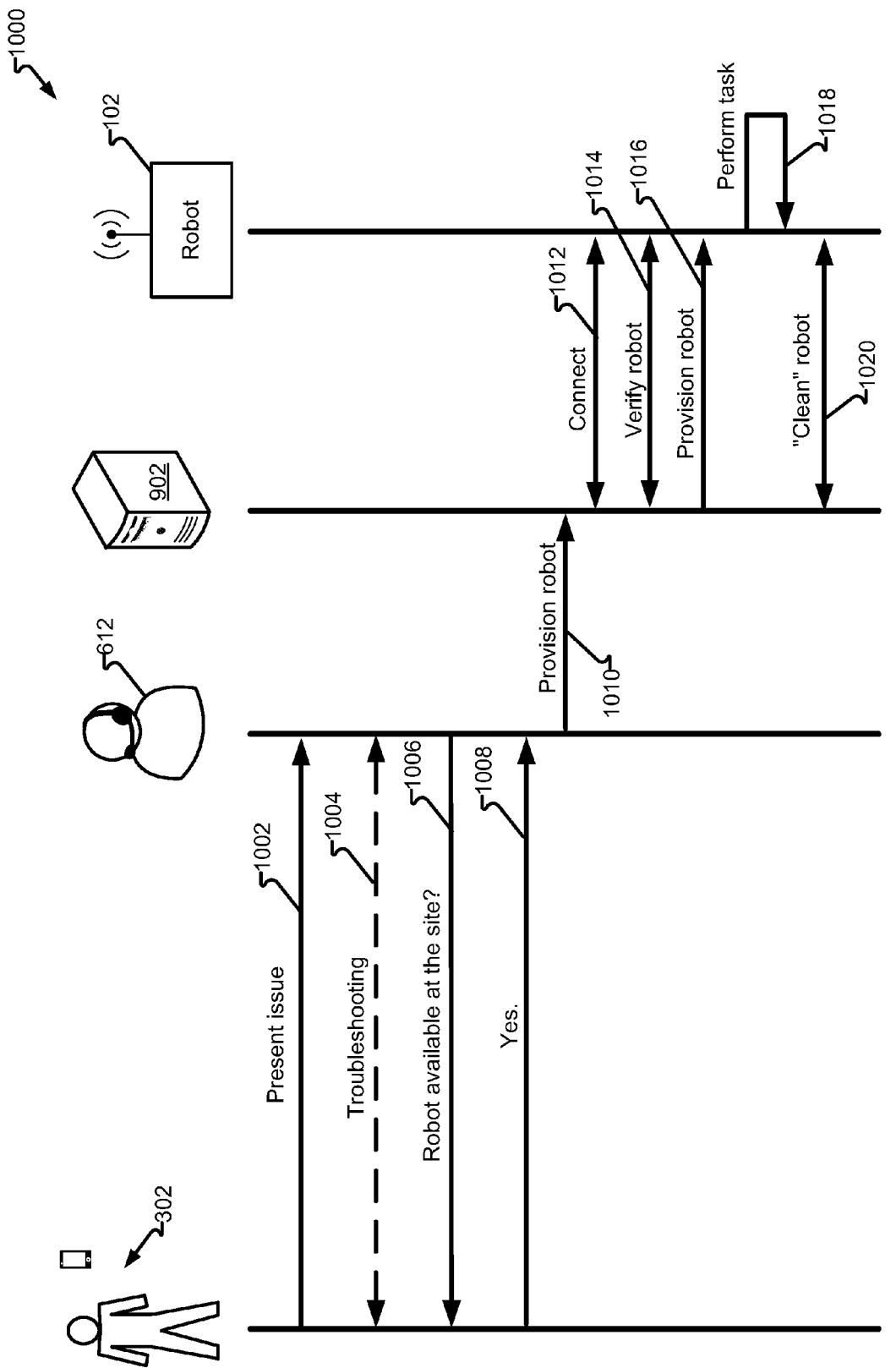
FIG. 10 depicts a second interaction in accordance with embodiments of the present disclosure.

FIG. 10 depicts interaction 1000 in accordance with embodiments of the present disclosure. Interaction 1000 may be implemented when a robot 102, of unknown or unverified capability, is available to perform the task. In one embodiment, customer 302 contacts agent 612 and presents an issue at step 1002. Step 1004 may be provided to perform information gathering and/or troubleshooting. Agent 612 may determine that a robotic agent would be an option to perform the task. Steps 1006 and 1008 inform agent 612 that a robot is, or will be, available on-site, such as a customer-owned or operated robot.

Agent 612 may be provided with data regarding the on-site robot 102. At step 1010, Agent 612 causes server 902 to provision the robot. Step 1012 connects server 902 to robot 102 for provisioning. Step 1014 verifies the robot. Verification may be query-response (e.g., "What are your capabilities?" "What is your model number?" etc.) or operational. Agent 612 and/or other component of contact center 602 or other data repository may be able to determine capabilities upon accessing a robot's manufacturer, model number, options, etc. Operational verification may determine if robot 102 is capable of performing certain actions or performing certain actions with a required precision or force. For example, instructing robot 102 to perform an action and observing whether the action was performed with sufficient precision, strength, etc. The results may be determined via at I/O Device 206 or other observation. Verify step 1014 may also ensure that needed consumables (e.g., battery charge, chemicals, etc.) are, or can be made, available to robot 102 prior to performing the task.

Step 1014 may further determine that robot 102 has sufficient protection measures in place to ensure property, persons, and data are not going to be placed into a situation with undue risk. For example, step 1014 may ensure anti-viral, third-party monitoring, safety cut-offs, "kill" switch, scuttle, data ports, and/or other features are in working order and compliant with a previously determined safety criteria.

Step 1016 provisions robot 102, such as to ensure robot 102 is configured to perform the task, which may have been identified in step 1002. Step 1016 may be the application of software, hardware component, or both. Step 1016 may further provision additional robots (peer and/or supervisor) and ensure required inter-robot communications are, or will be, available when needed.

In step 1018, robot 102 performs the task and step 1020 cleans the robot. Step 1020 may be the return of physical accessories (attachments, other robots, etc.), the purging of software and/or data no longer needed or authorized, closing of communication channels, and/or other operation to ensure robot 102 is placed in an appropriate state following completion of the task in step 1018.

Figure 11:
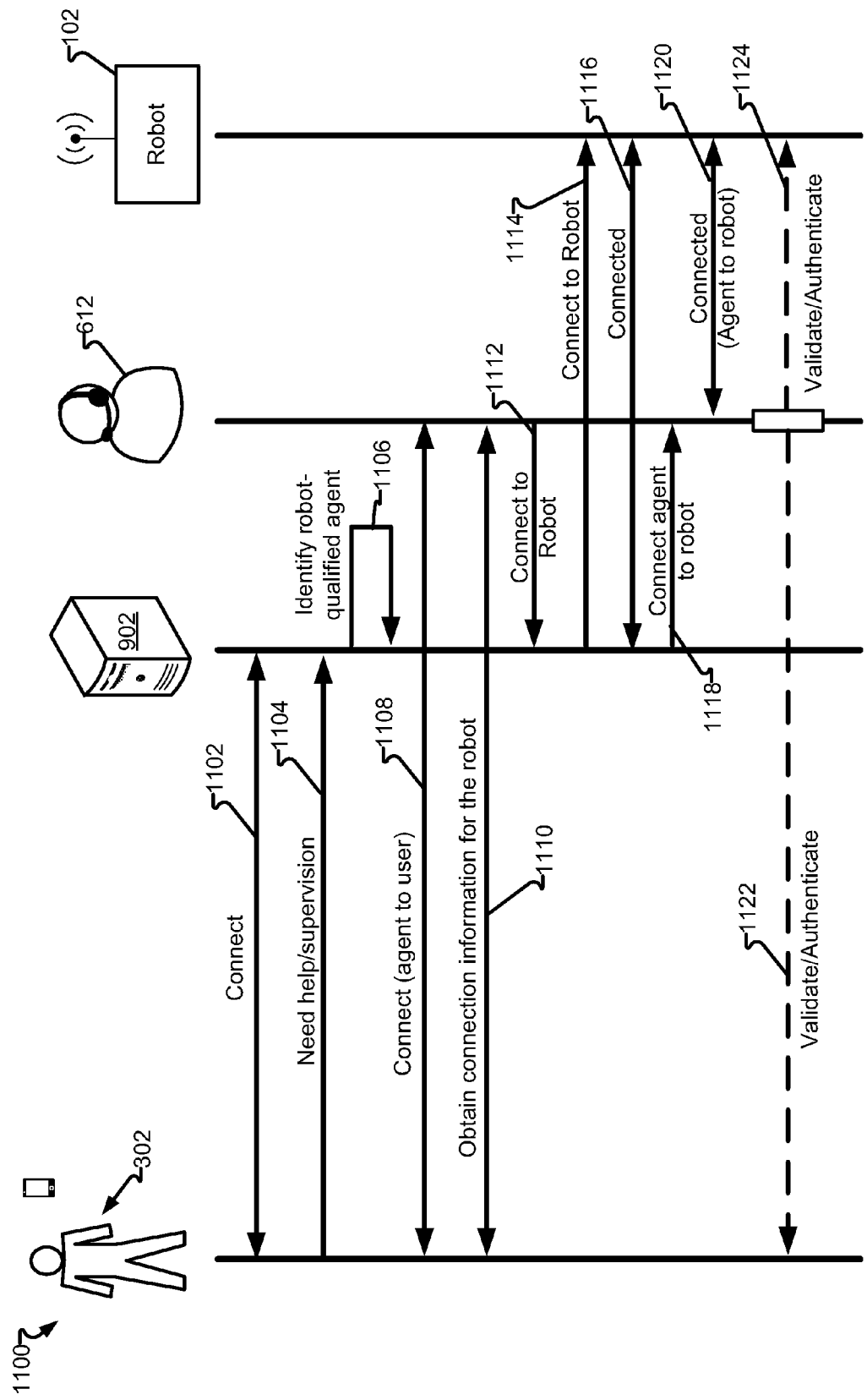
FIG. 11 depicts a third interaction in accordance with embodiments of the present disclosure.

FIG. 11 depicts interaction 1100 in accordance with embodiments of the present disclosure. Three communication nodes may be provided comprising robot 102, customer 302, and agent 612 for communications therebetween. Each node may be active simultaneously or at least one node may be unavailable at certain times in a procedure. In one embodiment, agent 612 serves as a node for communications between customer 302 and robot 102. For example, robot 102 may be delivered, by itself or other means, to customer 302. Customer 302 may be interacting with robot 102 for the first time and calls (e.g., telephone call, video call, text, etc.) a contact center 602, such accessing an automated agent executing on server 902, to begin the process of utilizing robot 102.

Customer 302 may initially connect with server 902, at step 1102, such as via an interactive voice response (IVR) to assess the nature of the call and/or enqueue the call. Customer 302 may ask for or be determined to require a robot-qualified agent at step 1104. Step 1106 identifies a robot-qualified agent, such as agent 612. And, in step 1108, agent 612 is connected to customer 302.

Step 1110 exchanges data between customer 302 and user 612, such as connection information, that may not have previously been obtained. Step 1112 initiates a connection between agent 612 and robot 102 via server 902. Server 902 attempts to connect to robot 102 in step 1114 and, once the connection is established in step 1116, then connects robot 102 to agent 612 in step 1118. As a result, in step 1120 agent 612 and robot 102 are connected.

Optionally, validation/authentication steps may be performed. customer 302 may have been authenticated via a device, such as customer communication device 608 (See, FIG. 6) which in turn authenticates user 302 to a resource 612 of a contact center, such as server 902. However, validation/authentication may still be performed to ensure the correct robot 102 is available to the correct customer 302. For example, in step 1122, agent 612 may ask customer 302 to issue a verbal, textual, gesture, or other password to robot 102. Agent 612 then observes the response, either directly or via receiving indicia that the password is correct as determined by a component electronically monitoring robot 102. Similarly, agent 612 may cause robot 102 to perform an action in step 1124 and ask customer 302 or a device associated with customer 302 if robot 102 is performing a particular action. If successful, then agent 612 has confirmed that robot 102 is associated, and optionally within sight, of customer 302.

Figure 12:
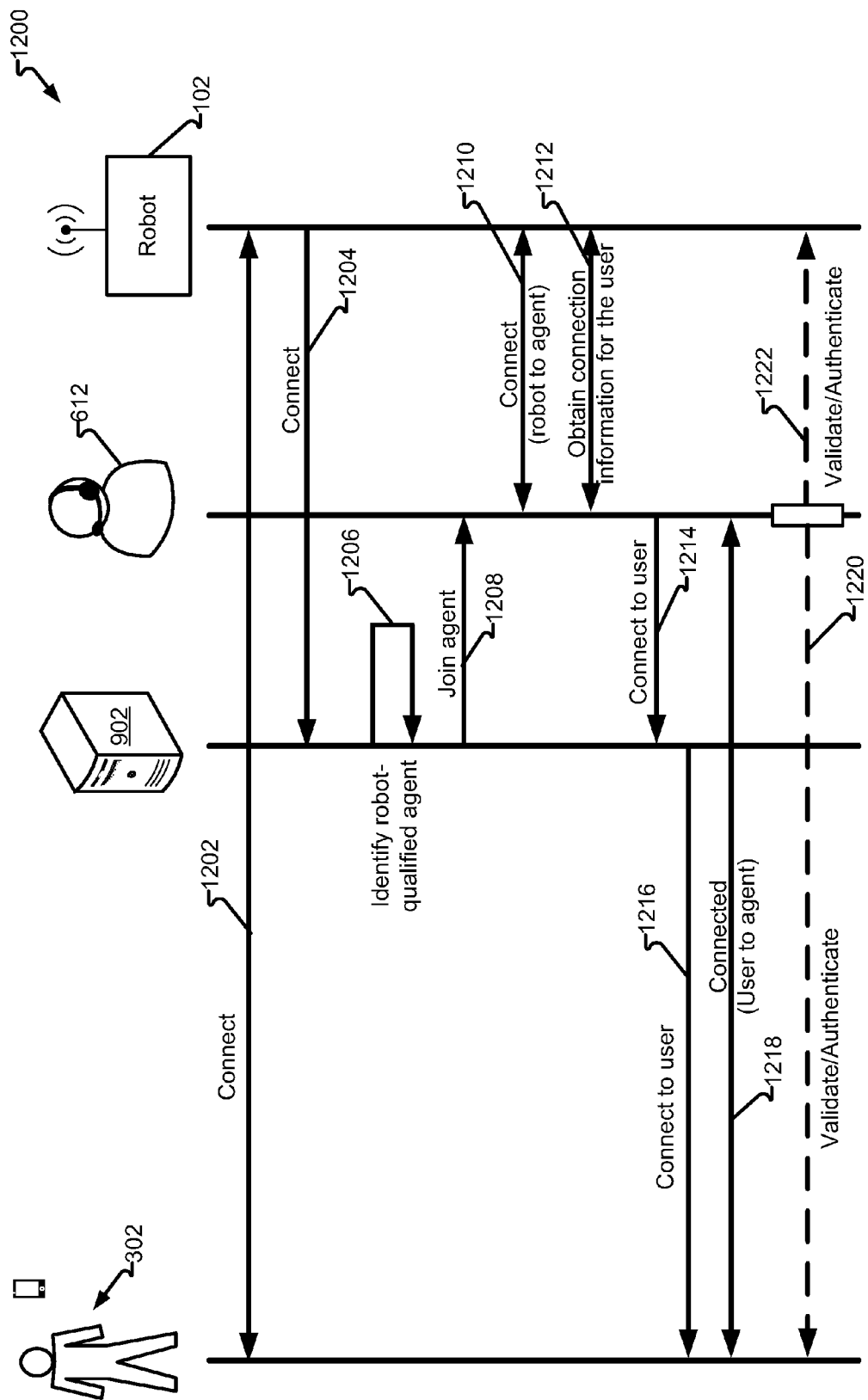
FIG. 12 depicts a fourth interaction in accordance with embodiments of the present disclosure.

FIG. 12 depicts interaction 1200 in accordance with embodiments of the present disclosure. In step 1202, customer 302 connects to a resource, such as agent 612, via robot 102 acting as a communication node or endpoint. For example, customer 302 may own or have access to robot 102 and seek to use it for a task. In one embodiment, customer 302 connects a customer communication device 608 to robot 102 for communicating with robot 102 and, optionally, agent 612. In another embodiment, customer 302 communicates directly (e.g., speaking, typing, etc.) with robot 102. Next, robot 102 connects with server 920 in step 1204. Server 902, in step 1206, identifies a robot-qualified agent, such as agent 612 and, in step 1208, joins agent 612 to robot 102 for communications therebetween.

In step 1210, robot-to-agent communications are provided and, in step 1212, connection information is obtained to enable agent-to-customer communications. Step 1212, may be the determination that robot 102 will facilitate agent-to-customer communications, obtaining a telephone number or other telecommunications address that agent 612 may utilize to call or otherwise establish another communications channel with customer 302. Accordingly, in step 1214, agent 612 may initiate the connection with customer 302 via server 902. Server 902 then connects to customer 302 at step 1216 and, in step 1218, customer 302 and agent 612 are connected.

Optionally, validation steps 1220 and/or 1222 are provided. For example, in step 1220, agent 612 may prompt customer 302 for a username, password, password gesture or other authentication indicia. Robot 102 may observe and report or serve as a communications node for agent-customer communications. If not already authenticated, step 1222 may be performed to authenticate robot 102 to agent 612.

Once agent 612, customer 302, and robot 102 are in communication, certain tasks may then be possible. For example, customer 302 may explain an issue and agent 612 may initiate an action on robot 102 to resolve the issue. Communications need not happen in parallel. For example, robot 102 may operate autonomously while agent 612 is connected to customer 302 to ask if the task was performed satisfactorily, resolve any outstanding issues, and, if necessary, coordinate purging of any sensitive information no longer needed, arrange the retrieval of robot 102 or an accessory thereof.

Figure 13:
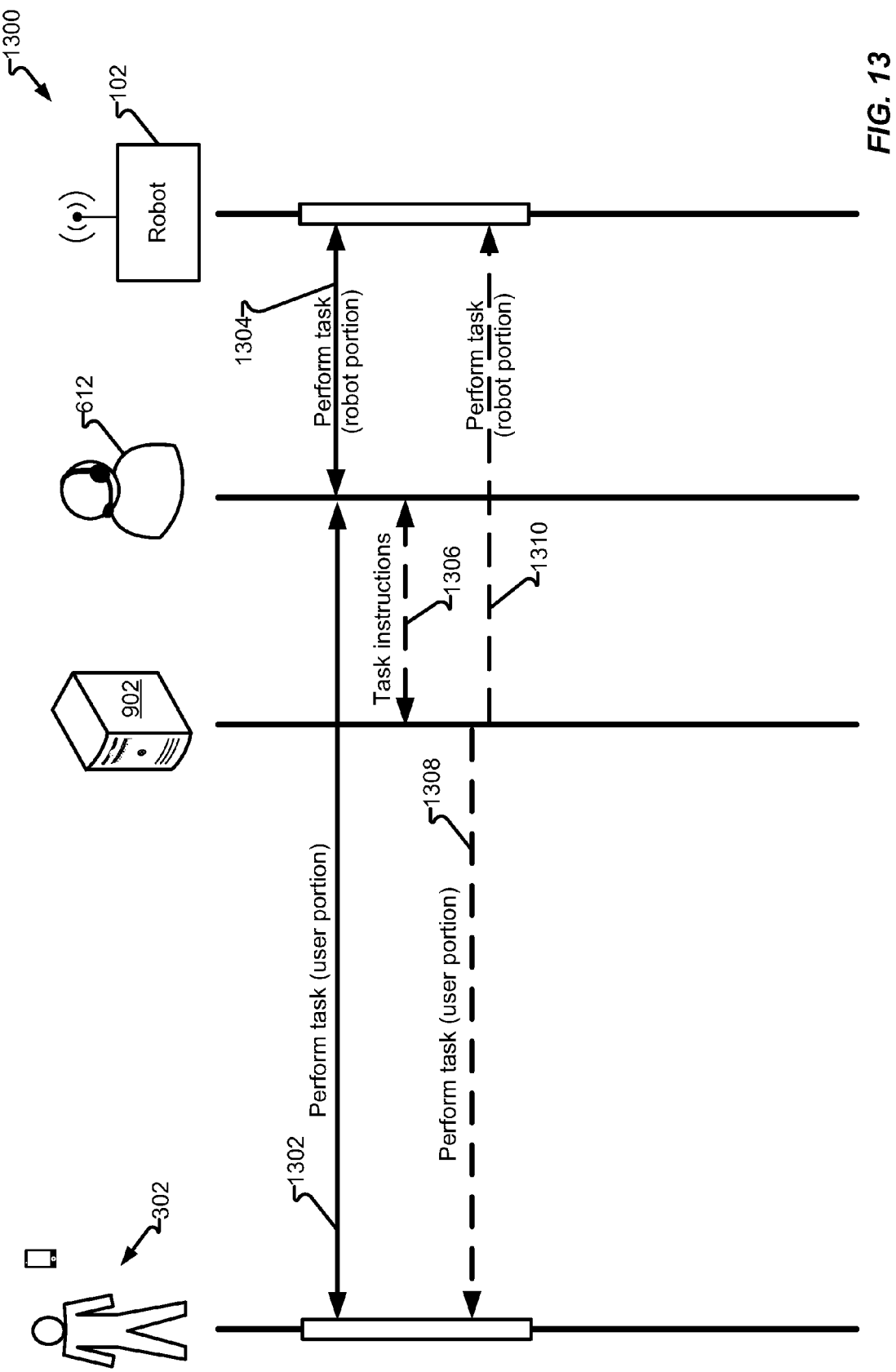
FIG. 13 depicts a fifth interaction in accordance with embodiments of the present disclosure.

FIG. 13 depicts interaction 1300 in accordance with embodiments of the present disclosure. Certain tasks may not be able to be completed by robot 102 alone. For example, customer 302 may need to make a selection to their liking or assist robot 102 with a physical task. In one embodiment, agent 612 may be utilized to coordinate efforts between user customer 302 and robot 102. In step 1302, agent 612 directs user 302 to perform a particular task. In step 1304, agent 612 directs robot 102 to perform a counterpart portion of the task. For example, robot 102 may access a live wire upon user 302 disconnecting power to the wire and so communicating the fact to agent 612. In another example, robot 102 may be performing a medical function and agent 612 may coordinate with user 302 to address any preliminary tasks (e.g., position an arm for a blood pressure cuff, etc.) and signal robot 102 to begin the task (e.g., taking a blood pressure, etc.).

Agent 612 may provide task instructions 1306 to server 902 for implementation via robot 102, such as to perform the robot portion of a task at step 1310. Similarly, server 902 may issue task instructions to user 302 in step 1308 to further automate the performance of a coordinated task.

Figure 14:
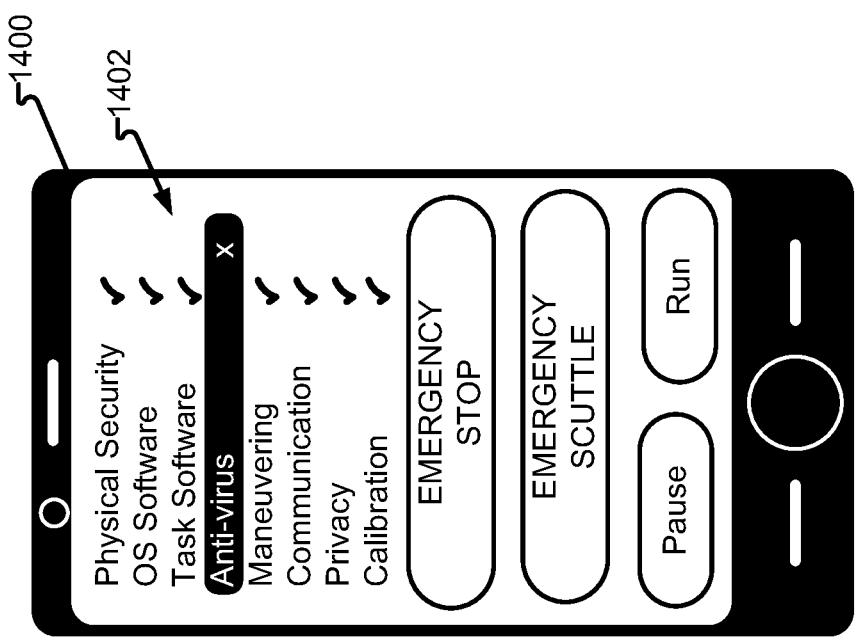
FIG. 14 depicts a sixth interaction in accordance with embodiments of the present disclosure.

FIG. 14 depicts device 1400 in accordance with embodiments of the present disclosure. Device 1400 may be one of communication devices 608 configured with functionality associated with robot 102 with which device 1400 may be in communication directly or via contact center 602. Device 1400 may comprise an input and/or output means for robot 102 via communication link 232, sensor 228, and/or I/O device 230. Device 1400 may comprise a network communication to utilize local (e.g., WiFi, infrared, etc.) communications and/or distance communications (e.g., cellular, GPS, etc.) for inputs and/or outputs. Optionally, device 1400 may be wired (e.g., Ethernet, direct connection to robot 102, etc.).

Device 1400 may comprise display 1402 proving statuses, input means, and/or outputs for robot 102. In one embodiment, device 1400 may be utilized for providing robot 102, authorizing robot 102 to perform a task; pausing or terminating operations of robot 102; and optionally scuttling robot 102, such as be causing the destructive, or non-destructive, purging of data and/or circuitry within robot 102. Device 1400 may be utilized and a communication device with contact center 602 and agent 612 and may further operate as a node in a communication link between contact center 602 and robot 102 and/or a third-party, such as via an verification and/or auditing service.

Figure 15:
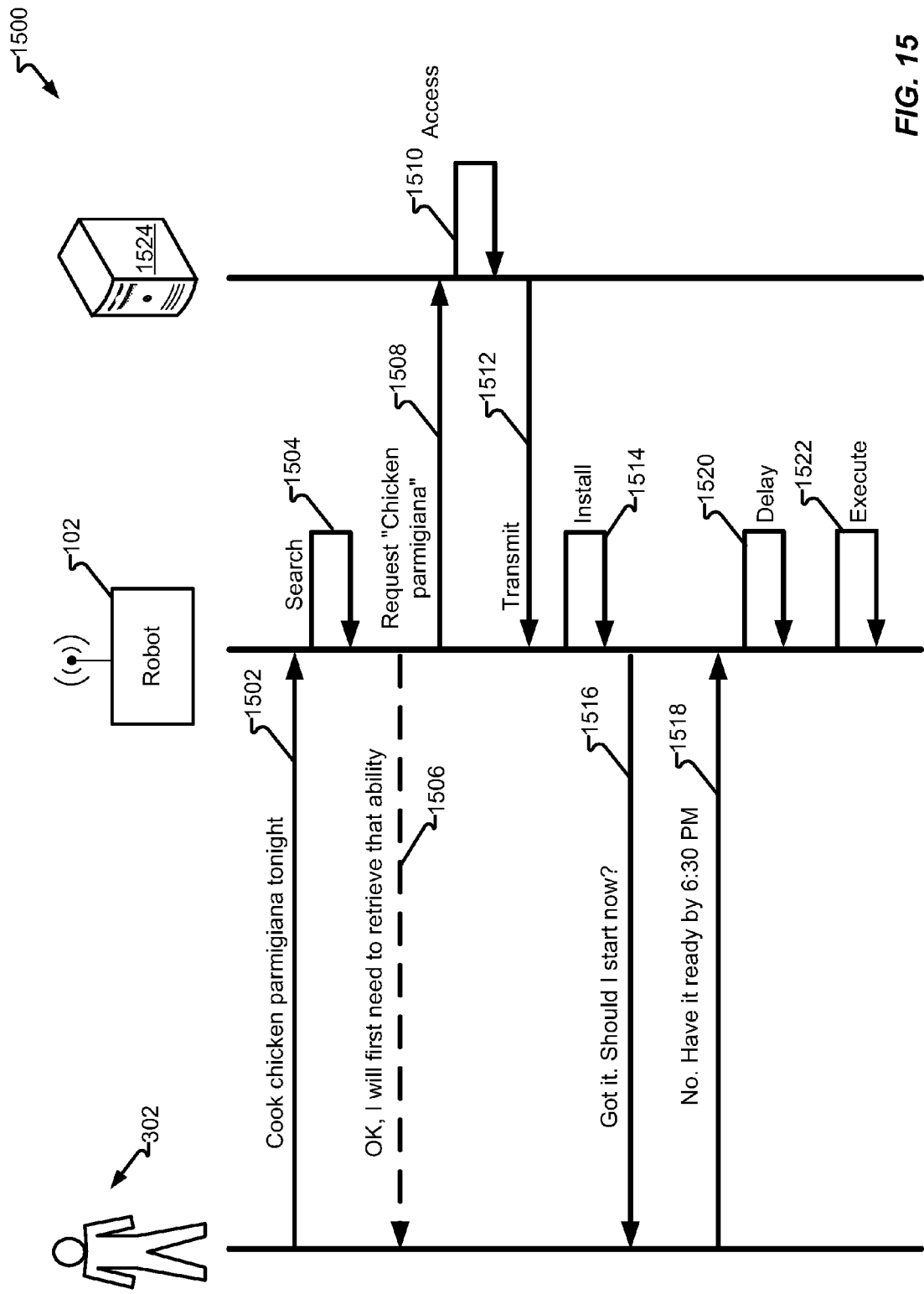
FIG. 15 depicts a seventh interaction in accordance with embodiments of the present disclosure.

FIG. 15 depicts interaction 1500 in accordance with embodiments of the present disclosure. In one embodiment, user 302 presents customer service request 1502 to robot 102. Robot 102 may then perform search 1504 to determine if customer service request 1502, comprising a customer service task, is performable based on resources already available (e.g., instructions maintained by robot 102 and/or additional devices, which may include additional robots). Optionally, robot 102 may issue reply 1506, such as to notify user 302 that customer service request 1502 is not presently possible, but such functionality may be obtained. As a further option (not shown) user 302 may be required to grant permission for robot 102 to retrieve the functionality.

Robot 102 issues request 1508 for instructions, such as those comprising physical interaction instructions, to enable the performance of a customer service task to satisfy the customer service request 1502. In one embodiment, request 1508 may be issued to a local and/or remote data repository 1524. In another embodiment, request 1508 may be issued to data repository 1524 internal with robot 102, such as when a second robot is to be configured with the instructions. Data repository 1524 accesses 1510 the requested instructions and transmits 1512 the instructions back to robot 102. As will be discussed more completely with respect to FIG. 16, the instructions may be provided to a different device from robot 102.

In one embodiment, robot 102 performs installation 1514 comprising installing the instructions on itself. In another embodiment, robot 102 performs installation 1514 comprising installing the instructions on another component. In yet another embodiment, robot 102 performs installation 1514 comprising installing a first portion of the instructions on itself and a second portion of the instructions on another component. A physical interaction instruction may be embodied in the first portion alone, the second portion alone, or both the first and second portions.

Robot 102 may cause execution 1522 or, optionally, provide additional interaction. For example, robot 102 may provide notification 1516 to human 302 to indicate that the instructions have been received and, as a further option, receive command 1518 to initiate the execution or (as illustrated) delay execution and execute delay 1520. When delay 1520 ends, execute 1522 is performed and the customer service task associated with customer service request 1502 is executed.

Provisioning of robot 102, via installation 1514, may further comprise a configuration. In one embodiment, customer service request 1502 may comprise a configuration (e.g., select a recipe that is "Heart Smart," avoid a particular ingredient, modify any pasta recipe selected to use whole-wheat pasta, etc.). Accordingly, server 1524 may access and/or generate an appropriate response. Robot 102 may be provided with the ability to access conversions or other customizations and apply modifications (e.g., self-provision and/or provision another component to modify a cooking time, etc.). For example, user 302 may instruct robot 102 to customize the instruction installed in step 1514 (e.g., "Use a salt substitute instead of real salt," "Use that recipe but just use up the left over provolone cheese, don't open the new mascarpone." etc.).

Customization may comprise a number of trade-offs. For example, noise may be exchanged for speed. User 302 may instruct robot 102 to obtain, or configure, instructions to cook a meal with minimum noise, such as from chopping. As a result, robot 102 operates at a reduced speed to reduce the sound of chopping, which may increase the preparation time. In another embodiment, a configuration to the instructions installed in installation 1514 may be provided by way of observation. For example, user 302 may demonstrate a preferred manner in which a knife is to be used. Robot 102 may observe user 302 and the usage of the knife (e.g., apparent force used, size of pieces cut, angle of the blade, etc.) and then mimic the actions of user 302 to perform the task.

Figure 16:
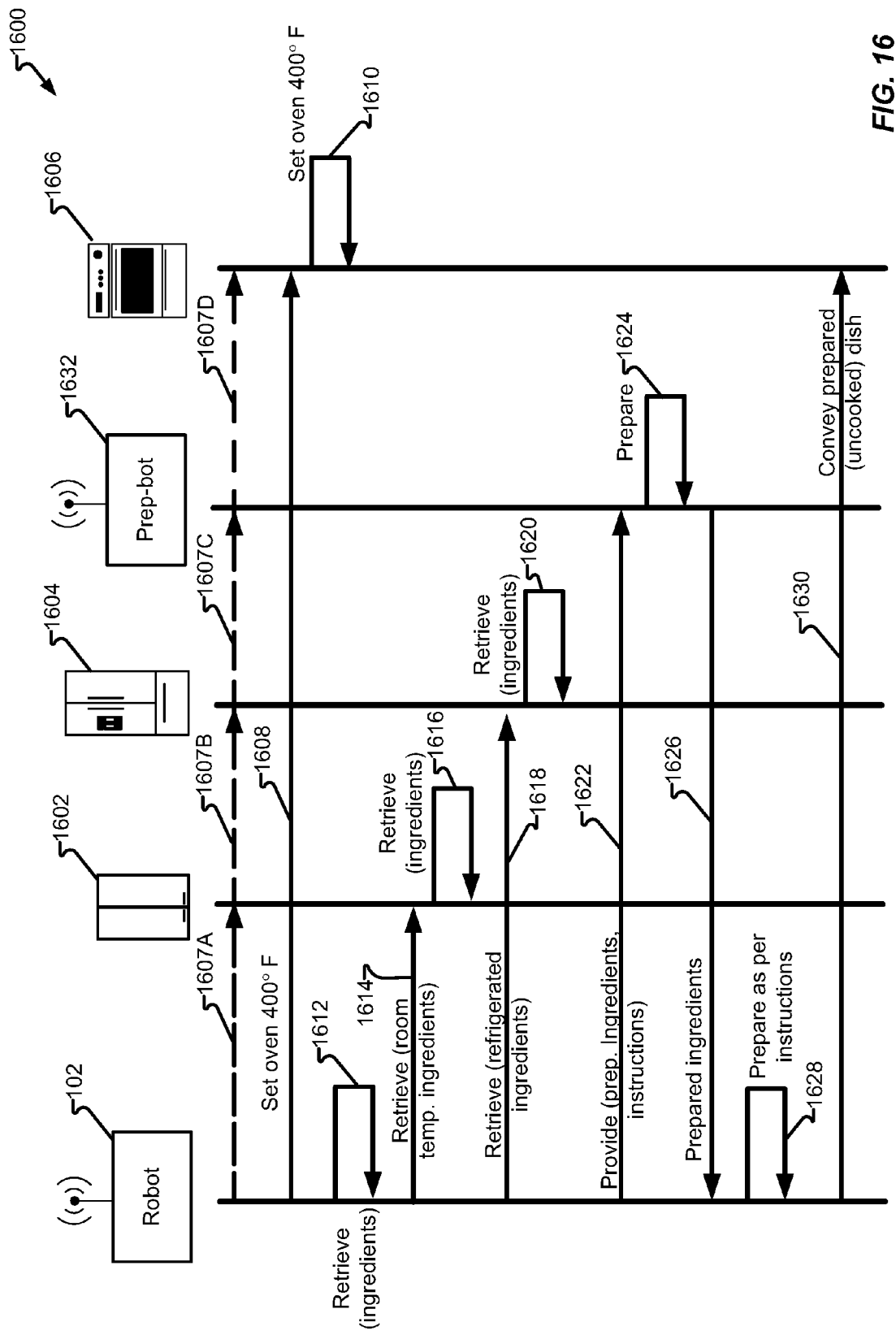
FIG. 16 depicts an eighth interaction in accordance with embodiments of the present disclosure.

FIG. 16 depicts interaction 1600 in accordance with embodiments of the present disclosure. In one embodiment, robot 102 causes one or more of devices 1602, 1604, 1632, and 1606 to be transformed to a configured state to perform a particular task from an unconfigured state that is unable to perform the particular task, the particular task requiring a physical interaction (e.g., handling, positioning, applying a force, transforming, heating, cooling, illuminating, etc.). Robot 102 may directly transform one or more of devices 1602, 1604, 1632, and 1606 or initiate a "daisy chain" transformation, wherein one or more of devices 1602, 1604, 1632, and 1606 transforms another one or more of devices 1602, 1604, 1632, and 1606. Once devices 1602, 1604, 1632, and 1606 and robot 102 are transformed, a customer service task requiring a physical interaction may be performed. In one embodiment, robot 102 issues one or more of instructions 1607A-1607D to an associated one or more of devices 1602, 1604, 1632, and 1606. One or more of devices 1602, 1604, 1632, and 1606 may comprise a single-purpose device (e.g., oven 1606, refrigerator 1604, automated cabinet 1602, etc.) and/or a multipurpose device, such as another robot (e.g., food preparation robot 1632, etc.).

In one embodiment, a physical interaction to be performed is the preparation of a meal. It should be appreciated that a near infinite other physical interactions may be performed without departing from the scope of the disclosure provided herein. In one embodiment, interaction 1600 issues instruction 1608 to device 1606 (e.g., an oven). In response, device 1606 executes instructions 1610, which may have been provided in step 1607D, to comply with instruction 1608.

In one embodiment, robot 102 orchestrates a plurality of other devices 1602, 1604, 1632, and 1606. In another embodiment, robot 102 may initiate a process performed autonomously by one or more of devices 1602, 1604, 1632, and 1606. In one example, robot 102 executes command 1612 requiring physical interactions from devices 1602, 1604, and 1632. Accordingly, commands 1614, 1618, and 1622 are issues causing physical interaction 1616, 1620, and 1624, respectively. Robot receives outputs 1626 and executes instructions 1628 and 1630. As can be appreciated by those of ordinary skill in the art, certain steps may be added, omitted, and/or reordered without departing from the scope of the disclosure.

Figure 17:
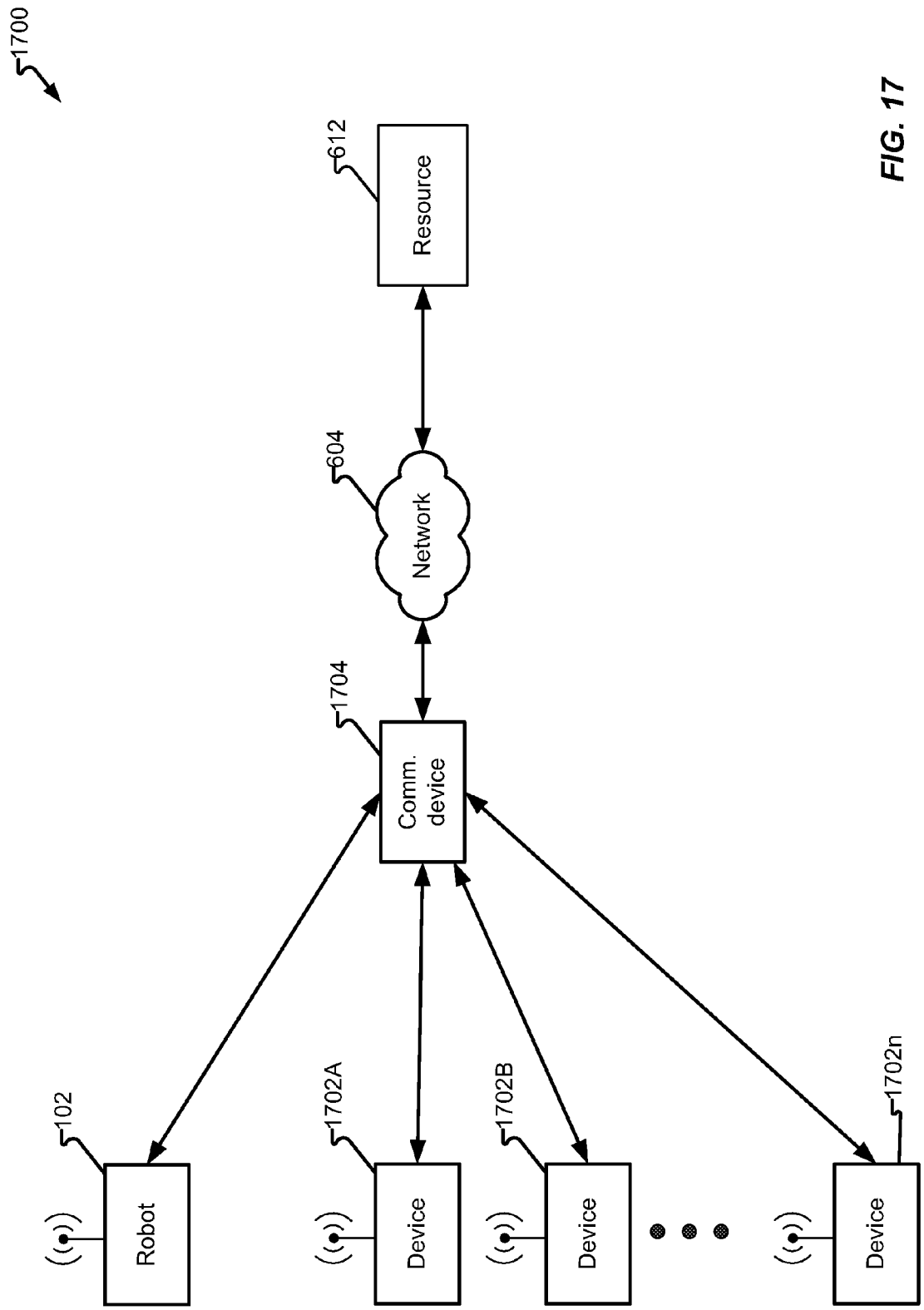
FIG. 17 depicts a fifth system in accordance with embodiments of the present disclosure.

FIG. 17 depicts system 1700 in accordance with embodiments of the present disclosure. In one embodiment, robot 102, alone or with one or more devices 1702A-1702n, is performing a customer service task comprising a physical interaction and further requiring inputs from resources 612, which may be further embodied as a human agent, automated agent, or a combination thereof. For example, resource 612 may be one of a linked node 234 and receive video input from robot 102 comprising I/O device 230 embodied as a camera, and provide fine motor control to mobility/actuator 226 via communication link 232.

A customer service task may have a criticality associated with it, such as due to a risk to persons, property, or data should an errant movement or mistimed action occur. Accordingly, having reliable communications may be critical; however, bandwidth may be limited. The customer service task may be delayed. Bandwidth utilization may be monitored, such as via communication device 1704 (e.g., router, hub, switch, gateway, firewall, edge device, etc.), and the customer service task initiated upon sufficient bandwidth becoming available. The bandwidth limitation may be due to actions associated with resource 612, or contact center 602. For example, if resource 612 is a human or automated agent currently engaged in another activity and unable to accommodate the interaction associated with the customer service task, the customer service task may be postponed until resource 612 is able to accommodate the interaction.

To obtain, or maintain, sufficient bandwidth, robot 102 may signal other devices, such as ones of devices 1702A-1702n not engaged in the interaction, to refrain from utilization of the communication device 1704 and/or network 604. The signal may be time limited or expire upon a second signal indicating that devices 1702A-1702n may return to normal bandwidth utilization activities. In another embodiment, communication device 1704 may be operable to limit and/or prioritize communication to and/or from robot 102 and/or devices 1702A-1702n. Accordingly, robot 102 may request communications from devices 1702A-1702n not engaged in the customer service task be throttled, prevented, or otherwise restricted or prioritized such that a required bandwidth to perform the interaction is provided by the available bandwidth. Should excess bandwidth be available (e.g., available bandwidth less bandwidth required for the interaction), the excess bandwidth may be made available to one or more of devices 1702A-1702n or other components.

In an emergency or similar event, robot 102 or at least one device 1702A-1702n engaged in the customer service task may utilize a second communication channel not associated with the bandwidth limitation. For example, should a required bandwidth become unavailable, robot 102 may initiate a second communication channel with resource 612 utilizing a cellular telephone network.

Figure 18:
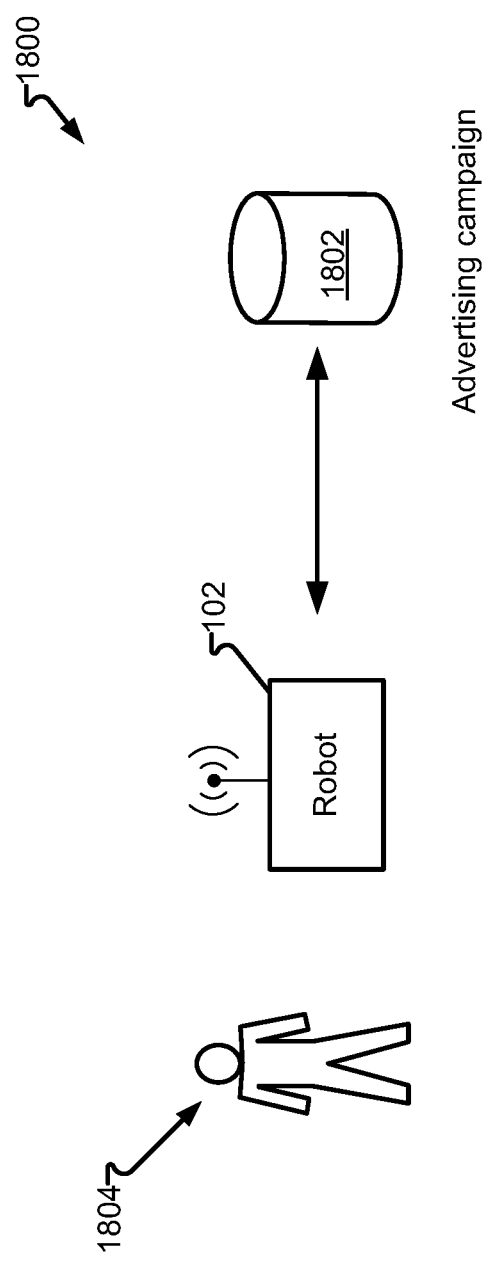
FIG. 18 depicts sixth system in accordance with embodiments of the present disclosure.

FIG. 18 depicts system 1800 in accordance with embodiments of the present disclosure. In one embodiment, robot 102 observes human 1804. Human 1804 may be observed via I/O device 230 embodied as a camera, microphone, force gauge, etc. Human 1804 may make an observable action, such as an expressed statement, implied statement, behavior, attempted behavior, etc. The observable action may be compared to entries in database 1802, such as entries associating observable actions with advertising placements. For example, human 1804 may show signs of difficulty climbing stairs. Robot 102 may compare the observed human activity with entries in database 1802 and retrieve an advertisement placement for an associated product or service (e.g., aspirin, home health care, etc.). Robot 102 may then present the advertisement placement expressly (e.g., "You need to buy . . . ," "You should use . . . ," etc.) or weave it into a conversation (e.g., "If your knees are bothering you, you may want to apply ice or take some Brand X aspirin."). Robot 102 may present an advertisement on integrated and/or associated devices (e.g., displays, speakers, etc.). In another embodiment, robot 102 may be able to receive acknowledgement to perform a customer service action associated with the presented advertisement, such as to order the aspirin, initiate contact with a home health care representative, etc. As a further option, instructions associated with the acknowledgement to perform a customer service action may be retrieved and executed by robot 102 and/or other devices.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA).

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion coprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to robotic service agents. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a robot integrated with a communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts and interactions have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A first robot, comprising:
a processor;
an interface connecting an input/output device to the processor;
the processor:
  receives a request, via the interface, to perform a task at a service location, the task comprising a physical interaction by a second robot at the service location;
  determines that the second robot is in an unconfigured state, comprising a set of instructions absent a physical interaction instruction required to enable the second robot to perform the physical interaction; and
  upon determining that the second robot is in the unconfigured state, transforms the second robot into a configured state, comprising providing the physical interaction instructions to the second robot and causing the second robot to load the physical interaction instructions for execution.

2. The first robot of claim 1, wherein the processor signals the second robot, while the second robot is in the configured state, to execute the physical interaction instructions.

3. The first robot of claim 1, wherein the task is a customer service task and wherein:
the customer service task comprises a first portion and a second portion, the second portion comprising the physical interaction;
the processor executes the first portion; and
the processor signals the second robot to execute the second portion of the customer service task.

4. The first robot of claim 1, wherein the task comprises one or more physical aspects or activities within the service location and wherein the processor, upon determining that the task has been completed, causes the physical interaction instructions to be uninstalled thereby transforming the second robot back into the unconfigured state.

5. The first robot of claim 1, wherein the task is a customer service task and wherein:
the customer service task comprises an interaction with a remote agent; and
the processor, via the interface, connects to the remote agent and performs the customer service task comprising actions in accord with inputs received from the remote agent.

6. The first robot of claim 5, further comprising:
determining, by the processor, a needed bandwidth required to interact with the remote agent and an available bandwidth to interact with the remote agent; and
upon determining the needed bandwidth is less than the available bandwidth, delaying the customer service task until the needed bandwidth is not less than the available bandwidth.

7. The first robot of claim 6, further comprising:
determining, by the processor, the available bandwidth is less than the needed bandwidth due to a first level of bandwidth utilization of a device at the service location; and
upon determining the needed bandwidth is less than the available bandwidth, signaling the device to limit bandwidth utilization to a second level of bandwidth utilization, wherein the second level of bandwidth utilization is no more than the available bandwidth less the needed bandwidth.

8. The first robot of claim 6, further comprising:
determining, by the processor, the available bandwidth is less than the needed bandwidth due to a first level of bandwidth utilization of a device at the service location; and
upon determining the needed bandwidth is less than the available bandwidth, signaling the device to provide a prioritized communication for utilization of the needed bandwidth.

9. The first robot of claim 5, wherein the remote agent comprises an automated agent.

10. The first robot of claim 6, wherein a portion of the needed bandwidth is provided via a communication channel different from the communication channel providing the available bandwidth.

11. The first robot of claim 1, wherein:
the processor, via the interface, observes a human action of a human at the service location; and
the processor, upon determining the human action is associated with an advertisement campaign, presents a reference associated with the advertising campaign to the human.

12. A method, comprising:
receiving at a first robot comprising a processor, a request via an interface between the processor and an input/output device, the request further comprising a request for performance of a task at a service location, and the task further comprising a physical interaction by a second robot at the service location;
determining, by the processor, that the second robot is in an unconfigured state, the unconfigured state comprising a set of instructions absent a physical interaction instruction required to enable the second robot to perform the physical interaction; and
upon determining that the second robot is in the unconfigured state, transforming, by the first robot, the second robot into a configured state, comprising providing the physical interaction instructions to the second robot and causing, by the processor, the second robot to load the physical interaction instructions.

13. The method of claim 12, further comprising, signaling, by the processor, the second robot, while the second robot is in the configured state, to execute the physical interaction instructions.

14. The method of claim 12, wherein the task is a customer service task and wherein:
the customer service task comprises a first portion and a second portion, the second portion comprising the physical interaction;
executing, by the processor, the first portion; and
signaling, by the processor, the second robot to execute the second portion of the customer service task.

15. The method of claim 12, wherein the task is a customer service task and further comprising:
wherein the customer service task further comprises an interaction with a remote agent; and
delaying, by the processor, execution of the customer service task until a sufficient bandwidth is detected to enable the interaction comprising inputs from the remote agent; and
executing, by the processor, the customer service task comprising the input from the remote agent.

16. The method of claim 15, further comprising,
determining, by the processor, a bandwidth limitation is present whereby sufficient bandwidth is not available to timely receive the inputs from the remote agent; and
delaying, by the processor, the customer service task until the bandwidth limitation is negated.

17. The method of claim 16, further comprising, negating, by the processor, the bandwidth limitation by signaling at least one component at the service location utilizing a bandwidth common with the interaction, to refrain for a period of time in accord with time required to perform the customer service task.

18. The method of claim 12, further comprising:
observing, via the input/output device, a human behavior;
accessing an advertising campaign associated with the human behavior and indicating an advertisement placement; and
presenting, by the processor, the advertisement placement.

19. A system, comprising:
means to receive at a first robot comprising a processor, a request via an interface between the processor and an input/output device, the request further comprising a request for performance of a task at a service location, and the task further comprising a physical interaction by a second robot at the service location;
means to determine, by the processor, the second robot is in an unconfigured state, the unconfigured state comprising a set of instructions absent a physical interaction instruction required to enable the second robot to perform the physical interaction; and
upon determining the second robot is in the unconfigured state, means to transform the second robot into a configured state, comprising means to provide the physical interaction instructions to the second robot and means to cause the second robot to load the physical interaction instructions for execution.

20. The system of claim 19, further comprising:
wherein the task comprises a first portion and a second portion, the second portion comprising the physical interaction;
means to execute, by the processor, the first portion of the task; and
means to signal, by the processor, the second robot to execute the second portion of the task, the second portion comprising the physical interaction.

* * * * *